United States Patent [19]

Jones et al.

[11] 4,194,892

[45] Mar. 25, 1980

[54] RAPID PRESSURE SWING ADSORPTION PROCESS WITH HIGH ENRICHMENT FACTOR

[75] Inventors: Russell L. Jones, Charleston; George E. Keller, II, South Charleston; Rex C. Wells, Charleston, all of W. Va.

[73] Assignee: Union Carbide Corporation, New York, N.Y.

[21] Appl. No.: 919,066

[22] Filed: Jun. 26, 1978

[51] Int. Cl.$^2$ .............................................. B01D 53/04
[52] U.S. Cl. .......................................... 55/58; 55/68; 55/74; 55/75
[58] Field of Search ................... 55/58, 62, 68, 74, 75, 55/387

[56] References Cited

U.S. PATENT DOCUMENTS

| | | | |
|---|---|---|---|
| 2,882,243 | 4/1959 | Milton | 55/75 X |
| 2,882,244 | 4/1959 | Milton | 55/75 X |
| 2,978,407 | 4/1961 | Tuttle et al. | 55/75 X |
| 3,104,162 | 9/1963 | Skarstrom | 55/58 |
| 3,138,439 | 6/1964 | Skarstrom | 55/58 X |
| 3,164,454 | 1/1965 | Wilson | 55/58 X |
| 3,237,377 | 3/1966 | Skarstrom | 55/58 X |
| 3,615,233 | 10/1971 | Doering et al. | 55/387 X |

OTHER PUBLICATIONS

Turnock, *The Separation of Nitrogen and Methane by Pulsating Flow Through a Fixed, Molecular Sieve Bed*, U. of Mich. Thesis, 2/1968.
Turnock et al., *Separation of Nitrogen and Methane via Periodic Adsorption*, AICHE Journal, 17, 335 (1971).
Kowler, *The Optimization of the Cycle Operation of a Molecular Sieve Adsorber*, U. of Mich. Thesis, 1969.
Kowler et al., *The Optimal Control of a Periodic Adsorber*, AIICHE Journal, 18, 1207 (1972).

*Primary Examiner*—Robert H. Spitzer
*Attorney, Agent, or Firm*—John C. Le Fever

[57] ABSTRACT

A rapid adiabatic pressure swing process with a total cycle time of less than 30 seconds, at least 8 psig feed gas is introduced to a single adsorbent bed of 20-120 mesh particles and bed length not exceeding three times the feed-reverse flow pressure difference and less than 96 inches, a reverse flow period at least twice the feed gas period, and a one component enrichment factor of at least 4.

14 Claims, 14 Drawing Figures

RAPID PRESSURE SWING ADSORPTION PROCESS WITH HIGH ENRICHMENT FACTOR

CROSS REFERENCE TO RELATED APPLICATIONS

An application "Rapid Pressure Swing Adsorption Process for Low Enrichment Factor Air Separation" is filed contemporaneously with this application Ser. No. 919,065 and in the name of Stuart G. Simpson.

BACKGROUND OF THE INVENTION

This invention relates to a process for separating gas mixtures having selectively adsorbable components as for example nitrogen from air, ethylene from nitrogen, and methane and/or carbon monoxide from hydrogen.

Pressure swing adsorption processes are well known for separating gas mixtures having selectively adsorbable components. By way of example one widely used system described in Wagner U.S. Pat. No. 3,430,418 employs four adsorbent beds arranged in parallel flow relationship with each bed proceeding sequentially through a multistep cycle. Since product discharge from a given bed is not continuous, the beds are arranged so that at least one of the four beds is always producing product i.e. one component-depleted gas discharged from the second end. In brief each bed employs an adsorption step in which at least one component of the feed gas mixture is selectively adsorbed from the feed gas introduced at the bed first end and the one component-depleted product gas is discharged from the second end of such bed. The previously described adsorption step is usually performed at the highest pressure of the process and is followed by a first depressurization step in which gas discharged from the bed at progressively lower pressure is used to perform other functions in the process, as for example repressurizing another previously purged bed and/or purging still another bed. This first depressurization step is usually in the same direction i.e. cocurrent, as the feed gas previously flowing through the bed during the adsorption step. After the first depressurization step a final depressurization step usually follows and is most commonly countercurrent to the gas flow during the preceding adsorption and first depressurization steps. During this step gas is usually released at the inlet end and contains desorbate. When depressurization is completed, a purge gas is usually introduced at the second end for countercurrent flow through the bed to desorb and sweep out the desorbate at the inlet end. When purging is completed the bed is repressurized with one component-depleted gas in preparation for return to the previously described adsorption step, and the cycle is repeated.

One disadvantage of the previously described type of pressure swing adsorption process is that multiple beds are required. Another disadvantage is complexity of the piping and multiple valving required to provide the necessary flow switching. Still another disadvantage is that the cycles are relatively long so that the equipment is relatively large and heavy. By way of example, in one such system for air separation the total cycle time for each bed to complete the adsorption through repressurization sequence for air separation in a four bed system is about 240 seconds. This means that the production rate of one component-depleted gas per pound of adsorbent (hereinafter referred to as "adsorbent productivity") is relatively low.

One possible approach to overcoming the previously enumerated disadvantages of multiple bed-relatively long cycle time pressure swing adsorption processes is the rapid pressure swing adsorption process (hereinafter broadly described as "RPSA"). In the RPSA system schematically shown in FIG. 1, a single adsorption bed 10 is provided comprising relatively small particles of adsorbent. The adsorbent particle size used by the prior art may, for example be between 40 and 60 mesh whereas with the aforedescribed multiple bed-relatively long cycle time pressure swing adsorption system (hereinafter referred to as "PSA") the major dimension of individual particles may, for example be 1/16 inch or larger pellets. As used herein, mesh size ranges refer to U.S. standard screens commonly used for sizing small particles. By way of example, "between 20 and 120 mesh" means particles in a size range which pass through a 20 mesh screen and are retained on a 120 mesh screen.

The adsorbent may be a single type of material as for example crystalline zeolite molecular sieve or activated carbon, or may comprise multiple layers or mixtures of different adsorbents for selective removal of particular components from the feed gas. As shown in FIG. 1 the feed gas contains at least two components and is introduced through conduit 11 and pressurized if necessary by compressor 12 followed by a feed surge tank before introduction through valve 13 into the first end 14 of adsorbent bed 10. At least one component of the feed gas is selectively adsorbed and one component-depleted gas is discharged from adsorbent bed second end 15 into conduit 16 having control valve 17 therein. If desired a product surge tank 18 may be provided in conduit 16 upstream valve 17.

In the RPSA system the small adsorbent particles provide the necessary flow resistance to operate the process whereas in PSA this flow resistance is minimized to reduce pressure drop in the adsorbent bed. The aforedescribed flow continues for a predetermined period which will hereinafter be referred to as the "feed gas introduction period" and the one component-depleted gas discharged from the single bed during this period will be termed the "product gas" although it should be understood that the one component desorbate gas thereafter released from first end 14 may be the desired product from a particular feed gas mixture, depending on the consumer's requirements. it is also possible that both gases separated in the RPSA system may be product gases in the sense that each is consumed and not released to the atmosphere.

Following the feed gas introduction period feed valve 13 is closed and exhaust valve 19 in conduit 20 joining the inlet end is opened. During the exhaust period (hereinafter also referred to as the second period) one component-depleted gas within adsorbent bed 10 flows in the reverse direction towards first or inlet end 14. This gas sweeps one component gas towards the first end after such gas has been desorbed from the adsorbent by pressure reduction i.e., the pressure differential between the gas in the bed during the feed gas introduction period and the exhaust pressure. Flow reversal occurs in the adsorbent bed while product is being continuously removed from the second end, and the flow reversal zone moves quickly from the first to the second end during exhaust. Although not essential for all RPSA systems, in some circumstances it may be desirable to provide pump 21 in exhaust conduit 20 to accelerate the reverse outward flow of one component-depleted purging-one component desorbate gas. As will be explained hereinafter typical times for the feed gas introduction period and the second or reverse outward flow period are relatively short and on the order of 0.1 to about 20 seconds. For this reason valves 13 and 19 are preferably the time triggered solenoid type for the relatively small systems described in the ensuing examples. Rotary and poppet valves or other fast-acting valves may be suitable for large systems. Although not essential, RPSA systems often employ a first end flow suspension or time delay step between the feed gas introduction and reverse outward flow, and during such period valves 13 and 19 are both closed but discharge of one component depleted product gas is continued during this period through second end 15.

In the prior art RPSA systems typified by the work of P. H. Turnock and D. E. Kowler at the University of Michigan, equal feed and exhaust times were selected as being most suitable. Unfortunately these prior art experiments involving $N_2$-$CH_4$ separation and air separation resulted in product recoveries (the percent of the one component-depleted gas recovered as product at the bed second end) prohibitively low and not acceptable for commercial use in any type of gas separation even when the feed gas is unlimited, as for example air separation. In any type of pressure swing adsorption system for a given product flowrate the investment cost is the sum of a function of the recovery (reflecting the compressor cost), plus the adsorbent productivity (reflecting the cost of the vessel holding the adsorbent), and other minor items. In general the investment cost is most greatly influenced by the product recovery and this factor represents at least 30% and up to 80% of the investment cost. In general by increasing the product recovery factor the aforementioned investment cost trade-off emphasizes the importance of relatively high product recovery processes. In addition to investment cost, the practioner must consider operating, i.e. power cost. Whereas the latter is unaffected by adsorbent productivity it is directly affected by product recovery. It will be recognized that product recovery may be increased by increasing the feed pressure but this is at the expense of increased power and the cost of power increases may be more rapid than the recovery improvement. In gas separations where the feed gas is available in limited quantity, as for example hydrogen separation and purification from feed gas mixtures containing $CH_4$ or CO, high product recovery is particularly important because the product and possibly also the exhaust gas must be compressed to substantial pressure such as 200 psig. for its end use. Also for a given adsorbent particle size, bed length and timing cycle, the cross-sectional area of the adsorbent bed is proportional to product gas recovery, i.e. relatively low recovery necessitates a relatively large bed to produce a given amount of product.

An object of this invention is to provide a rapid pressure swing adsorption process having substantially higher product recovery than heretofore attained by the prior art.

Another object is to provide a rapid pressure swing adsorption process providing relatively high adsorbent productivity in addition to the aforementioned high product recovery. Other objects will be apparent from the ensuing disclosure and appended claims.

SUMMARY

This invention relates to a rapid adiabatic pressure swing process for selectively adsorbing one component in a single adsorption bed and continuously discharging one component-depleted gas from the bed.

This invention is predicated on the discovery that adsorption particle size, inlet feed gas pressure, adsorption bed length, the feed gas introduction period and the reverse outward flow period each strongly influence the performance of an RPSA process in terms of product recovery and productivity, and are closely interrelated. Their respective influences and interrelationships have been identified and a process defined which represents a substantial advance in the art. More particularly this process affords a substantial improvement in product recovery for a variety of gas mixture separations without significant loss of adsorbent productivity. In the RPSA process of this invention the total cycle time for the adsorbent bed is less than 30 seconds whereas in PSA processes the total cycle time for each adsorbent bed is typically severalfold this upper limit, e.g. 165 seconds for a three bed air separation system and 240 seconds for a four bed air separation PSA system.

More specifically this invention relates to a rapid adiabatic pressure swing process for separation of a multicomponent feed gas by selectively adsorbing at least one component in a single adsorption bed of small particles by introducing feed gas to a first end and continuously discharging at least one component-depleted gas at the second end with a repetitive two step cycle sequence at the first end of feed gas introduction, and reverse outward flow of a one-component-depleted purging one component desorbate gas. The improvement comprises providing the feed gas at pressure of at least 8 psig. at the first end of the adsorbent bed, said feed gas having a separation factor of at least 2 with the adsorbent for feed gas pressures only less than 30 psig. The adsorbent bed comprises particles smaller than 20 mesh but larger than 120 mesh. These particles are packed in a first to second end bed length (in inches) not exceeding three times the difference between feed gas and reverse outward flow pressure (in psig.) and less than 96 inches as said adsorbent bed. The reverse outward flow is thereafter performed for a second period at least twice the feed gas introduction period with the first and second periods and gas flows such that the enrichment factor is at least four. As used herein, enrichment reflects the difficulty of the gas mixture separation to be performed and is expressed for binary mixtures by the formula $E = Y_p/(1 - Y_p) = (1 - Y_f)/Y_f$ where $Y_p$ = mole fraction of the least strongly adsorbed component in the product gas, and $Y_f$ = mole fraction of the least strongly adsorbed component in the feed gas. For multicomponent mixtures, $E = Y_p/1 - \Sigma Y_p) \times (1 - \Sigma Y_f)/Y_f$ where $\Sigma Y_p$ and $\Sigma Y_f$ = mole fractions of all components in the product and feed streams respectively less strongly adsorbed than the components to be depleted (or reduced in concentration in) the product.

As previously indicated, one of the requirements of this invention is that the feed gas must have a separation factor of at least 2 with the adsorbent for feed gas pressures only less than 30 psig. In a qualitative sense, the separation factor indicates the ease with which an adsorbent selectively removes one component of a gas mixture in preference to the other component(s) of the gas mixture. Mathematically the separation factor may be expressed as $\alpha$ i-j the molar ratio of the more strongly adsorbed component i to the less strongly adsorbed component j in the adsorbed phase, divided by the molar ratio of i to j in the gas phase all measured at equilibrium, i.e., $$\alpha_{ij} = \frac{\text{molar ratio of } i \text{ to } j \text{ in the adsorbed phase}}{\text{molar ratio of } i \text{ to } j \text{ in the gas phase}}, \text{ at equilibrium.}$$

Separation factors for various binary gas mixtures are listed in Table A. It should be noted that where the gas mixture contains more than two components, the separation factor may be determined on the basis of the most strongly adsorbed component i and the most important less strongly adsorbed component j i.e. the two main components between the separations is to be made.

TABLE A

| Binary Separation Factors | | | | | |
|---|---|---|---|---|---|
| Gas Mixture | | | Temp. | Gas Phase Partial Pressures | |
| i | j | Adsorbent | (°K.) | i | j | α i-j |
| $CH_4$ | $N_2$ | Zeolite 5A pellets | 295° K. | 1000 Torr | 1000 Torr | 1.22 |
| $N_2$ | $O_2$ | Zeolite 5A pellets | 323° K. | 1000 Torr | 1000 Torr | 2.49 |
| $C_2H_4$ | $N_2$ | Act. Carbon | 298° K. | 20 psia | 20 psia | 12.5 |
| $CH_4$ | $H_2$ | Act. Carbon | 273° K. | 1000 Torr | 1000 Torr | 288 |
| CO | $H_2$ | Zeolite 5A pellets | 273° K. | 1000 Torr | 1000 Torr | 137 |
| $CO_2$ | $H_2$ | Zeolite 5A pellets | 273° K. | 1000 Torr | 1000 Torr | 364 |
| $CO_2$ | $H_2$ | Act. Carbon | 273° K. | 1000 Torr | 1000 Torr | 524 |

In one preferred embodiment the feed gas introduction period is no more than 20% of the feed plus exhaust period ("feed time ratio").

In another preferred embodiment a first end flow suspension (time delay) step is interposed between the feed gas introduction and the reverse outward flow steps. This flow suspension step is of a duration which is less than ten times the feed gas introduction period and also less than one-half the second period of reverse outward flow.

The process of this invention is particularly well-suited for air separation to produce as the one component-depleted gas, a product gas comprising 75–95% oxygen. If the specific objective of the air separation process is to achieve maximum absorbent productivity with the penalty of less than maximum product recovery, the feed gas is provided at 20–60 psig. and crystalline zeolite molecular sieve of at least 5 angstroms apparent pore size and between 40 and 80 mesh particle size comprises the adsorbent in a bed length of 15–30 inches. The feed gas introduction period is 0.1–1 second, the period of the flow suspension step is less than 2 seconds and also less than five times the feed gas introduction period. The reverse outward flow period is 1–6 seconds but more than three times and less than forty times the feed gas introduction period and terminates at atmospheric pressure. By the aforedescribed high productivity at high enrichment air separation embodiment, 3–20 pounds of contained oxygen per day are produced per pound of crystalline zeolite molecular sieve adsorbent—a high value for adsorbent productivity. Also in this embodiment, 10–25% of the oxygen in the feed air is recovered in the product gas, a high level of product recovery not to the best of our knowledge previously achieved in rapid pressure swing adsorption systems (although not the maximum achievable with this invention). In this maximum productivity embodiment the product oxygen pressure varies cyclically within the range of about 0.01 to 8 psig.

If the practitioner wishes to achieve maximum recovery of product oxygen at some loss of adsorbent productivity, this may also be accomplished in still another air separation embodiment in which the feed air is also supplied at 20–60 psig. for a feed gas introduction period of 0.3–1 second to an adsorbent bed comprising the aforementioned crystalline zeolite molecular sieve of at least 5 angstroms apparent pore size and between 40 and 80 mesh particle size in a bed length of 3–5 feet. The duration of the flow suspension step is between five and ten times the feed gas introduction period but less than five seconds, and the reverse outward period is 8–20 seconds and terminates at atmospheric pressure. By this air separation adiabatic pressure swing adsorption process 25–40% of the oxygen in the feed air is recovered in the product gas, a remarkable performance in view of the Esso prior art described by Turnock wherein oxygen recovery was on the order of one percent. The product gas is provided with purity in the range of 85–95% oxygen corresponding to oxygen enrichment in the range of 21 to 72. The adsorbent productivity in this high product recovery embodiment is up to about 3 pounds of contained oxygen per day per pound of crystalline zeolite molecular sieve adsorbent. In this particular process the product oxygen is discharged at 0.01–5 psig.

In still another air separation embodiment of this invention, the objective is to provide a system for producing oxygen product gas suitable for human breathing from air feed gas of about 8–15 psig. and with compact portable equipment which can be used in the home by persons requiring an immediately available source of oxygen. This embodiment is hereinafter referred to as the medical oxygen system and employs the same molecular sieve adsorbent in a 40–80 mesh particle size range and a bed length of 15–30 inches. The feed gas introduction period is 0.25–1.5 seconds, the flow suspension period is between one-half and three times the feed gas introduction period but less than 1.5 seconds, and the second period of reverse outward flow is between two and one-half and twelve times the feed gas introduction period and also between 3 and 6 seconds and terminates at atmospheric pressure. In this medical oxygen system the oxygen recovery is 10–20% and the product purity is 85–95% $O_2$ corresponding to oxygen enrichment factors of 21 to 72. Up to 1.5 lbs. of contained oxygen is produced per pound of crystalline zeolite molecular sieve per day and the product oxygen is discharged at about 0.5–4 psig. A still further air separation embodiment is similar to the medical (breathing) portable system, but especially suited for supplying relatively large quantities of 85–95% oxygen for industrial purposes, e.g. 0.5–20 tons per day of contained oxygen. This so-called tonnage oxygen system receives air feed gas at 8–15 psig, discharges oxygen product at 1–4 psig., and employs the same crystalline zeolite molecular sieve adsorbent in a 40–80 mesh particle size range and a bed length of 15–30 inches. The feed gas introduction period and the flow suspension period are each 0.75–2.0 seconds, and the second period of reverse outward flow is between two and eight times the feed gas introduction period and also between 3 and 6 seconds, terminating at atmospheric pressure. In this embodiment 10–20% of the oxygen in the feed air is recovered in the product and up to 1.5 lbs. of contained oxygen is produced per pound of adsorbent per day.

This invention is useful in separation of $N_2$ gas streams containing hydrocarbons as the selectively adsorbed one component. By way of illustration it may be used to remove ethylene ($C_2H_4$) from a gas mixture comprising 75-90% by volume ethylene with the balance being nitrogen. This gas mixture is for example produced as a purge stream in many ethylene consuming or generation processes, and compressed to 30-60 psig. Activated carbon of between 20 and 80 mesh particle size comprises the adsorbent in a bed length of 2-5 feet. The feed gas introduction period is 0.1-1 second, the flow suspension period is less than 2 seconds and less than five times the feed gas introduction period, and the reverse outward flow period is 1-6 seconds but more than three times and less than forty times the feed gas introduction period and terminates at atmospheric pressure. In this process between 50 and 75% of the nitrogen in the feed gas is removed in the ethylene-depleted gas discharged from the second end and this gas contains 50-75% nitrogen corresponding to a nitrogen enrichment factor of 9. The valuable ethylene is recovered by discharge from the first end during the reverse outward flow period.

This invention is also quite useful in the separation of methane or carbon monoxide from mixtures with hydrogen and provides a relatively pure hydrogen product gas. These gas mixtures are introduced to an adsorbent bed preferably comprising crystalline zeolite molecular sieve for the $H_2$-CO separation or activated carbon for the $H_2$-$CH_4$ separation. Although such gas mixtures may be fed to the RPSA process at any pressure above 8 psig, in the specific embodiment hereinafter summarized, the feed gas is provided at 140-500 psig. The adsorbent is between 20 and 100 mesh particle size and in a bed length of 2-5 feet. In each instance, the feed gas introduction period of 0.1-1 second is followed by a flow suspension period of less than 1.5 seconds and less than four times the feed gas introduction period. With one exception the reverse outward flow period is between three and forty times the feed gas introduction period and also between 1 and 5 seconds and terminates at exhaust pressure of 0-60 psig. The exception is for processing at least 40% hydrogen-carbon monoxide feed gases with exhaust pressures below 30 psig., in which event the reverse outward flow period is between 20 and 40 times the feed gas introduction period and also between 10 and 20 seconds. These processes yield a product of at least 98% hydrogen to an hydrogen enrichment factor of 3.5-16 or higher. The hydrogen recovery in the product gas is 35-80% of the feed hydrogen.

In another preferred embodiment of this RPSA invention wherein the feed gas is a mixture comprising hydrogen as the desired product with carbon dioxide, methane and carbon monoxide. This feed gas is introduced at 120-300 psig. to a homogeneous mixture of activated carbon and crystalline zeolite molecular sieve of at least 4 angstroms apparent pore size and between 40 and 80 mesh particle size as the adsorbent in a bed length of 36-60 inches. The feed gas introduction period is 0.1-1 second, the period of the flow suspension step is less than 1.5 seconds and also less than four times the feed gas introduction period. The reverse outward flow period is 1-10 seconds and between three and twenty times the feed gas introduction period.

This RPSA process is the type predicted by equilibrium adsorption although it is not clear whether equilibrium exists at all times and in all parts of a system practicing the invention.

DISCUSSION OF PREFERRED EMBODIMENTS

As previously indicated, the pressure cycle of this process comprises at least a feed gas introduction period and an exhaust or reverse outward flow period and preferably a flow suspension period between the aforementioned two periods. The optimum cycle time for any particular gas separation according to this invention to achieve high recovery and high adsorbent productivity is dependent on the bed length, feed gas pressure and adsorbent particle size and the characteristics of each are discussed hereinafter beginning with the cycle time.

Figure 2:
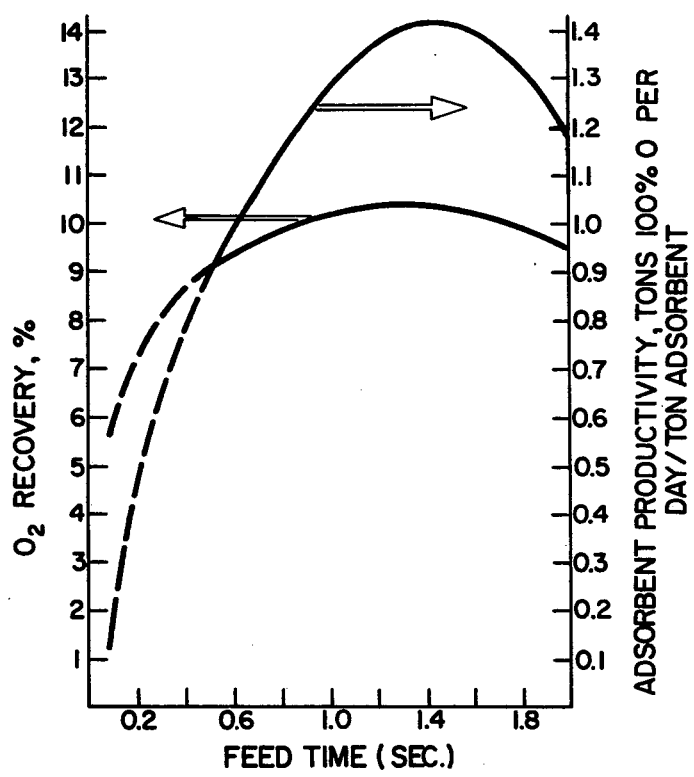
FIG. 2 is a graph showing the effect of feed time on oxygen recovery and adsorbent productivity for air separation in a 20 inch long bed with 10 psig. feed, no flow suspension and 4.2 seconds exhaust.

The duration of the feed gas introduction period regulates the amount of feed gas that enters the adsorbent bed per cycle. For a given adsorbent bed, increasing the feed quantity initially increases both the productivity and the recovery at a given purity of one component-depleted (product) gas. At a particular feed gas introduction time period the product recovery will reach a maximum and will thereafter decrease with increasing feed gas time. At a still longer feed gas introduction period the adsorbent productivity at a given product purity will begin to decrease, and if the feed gas introduction period is further extended a point will be reached at which a product of given purity cannot be produced. According to this invention, the bed length and adsorbent particle size are selected to keep the feed gas introduction period (which maximizes product recovery) relatively short. In most instances the feed gas introduction period is 0.1–1 second, with the lower limit being based on the minimum time to fill a substantial portion of the bed with feed gas. When longer feed gas introduction periods than 1.0 second give the maximum product recovery, this indicates that the adsorbent bed has too much resistance and the productivity can be increased with no loss in recovery by either increasing the absorbent particle size, reducing the adsorbent particle size distribution, or by shortening the bed length or a combination of the foregoing. The previously described effect of feed time on adsorbent productivity and product recovery are shown in the graph of FIG. 2 based on a 20-inch long cylindrical 3 inch diameter column of zeolite 5A of 40–80 mesh particle size processing feed air at 10 psig. with no delay time and an exhaust time of 4.2 seconds. A product surge tank volume of 2250 ml. was used.

Figure 3:
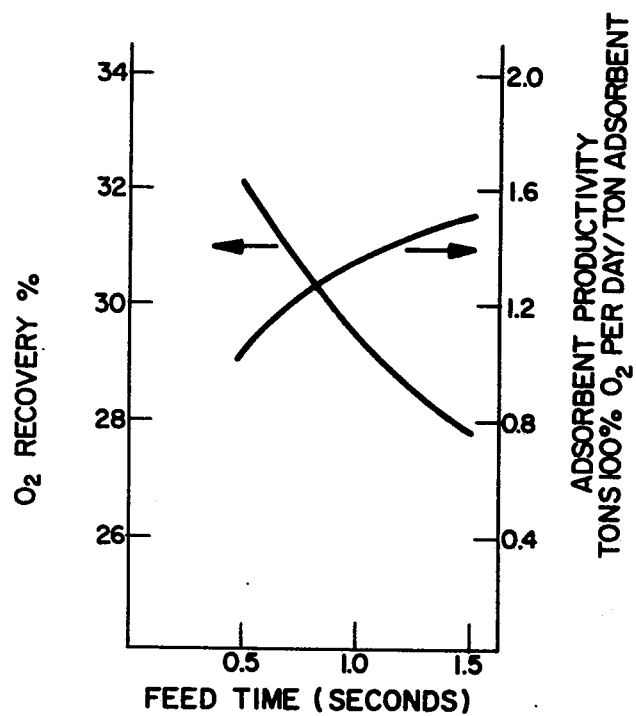
FIG. 3 is a graph showing the effect of feed time on oxygen recovery and adsorbent productivity for air separation in a 60-inch long bed with 50 psig. feed, no flow suspension and 15 seconds exhaust.

FIG. 3 shows the same effect for data taken at higher pressures using longer columns. This data is based on a 60-inch long cylindrical 3-inch diameter column of zeolite 5A using feed air at 50 psig. with a product surge volume of 2250 ml. The delay and exhaust times used were 2 and 15 seconds respectively.

In these and succeeding experimental data illustrating oxygen production by the present invention, the oxygen product purity is about 90 mol %. Unless otherwise indicated in this disclosure, all gas concentrations are in mols and mol percentages.

Figure 4:
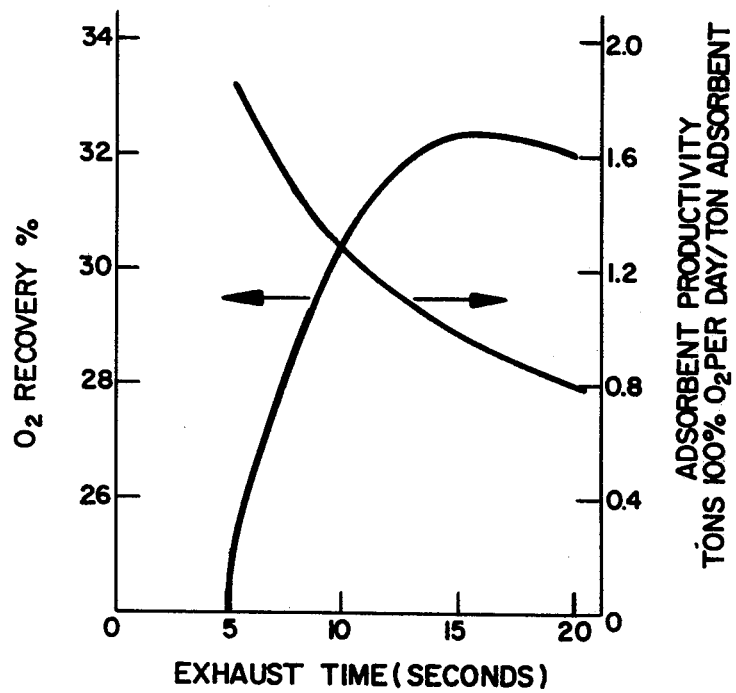
FIG. 4 is a graph showing the effect of exhaust time on oxygen recovery and adsorbent productivity for air separation in a 60 inch long bed with 50 psig. feed for 0.5 seconds.
Figure 5:
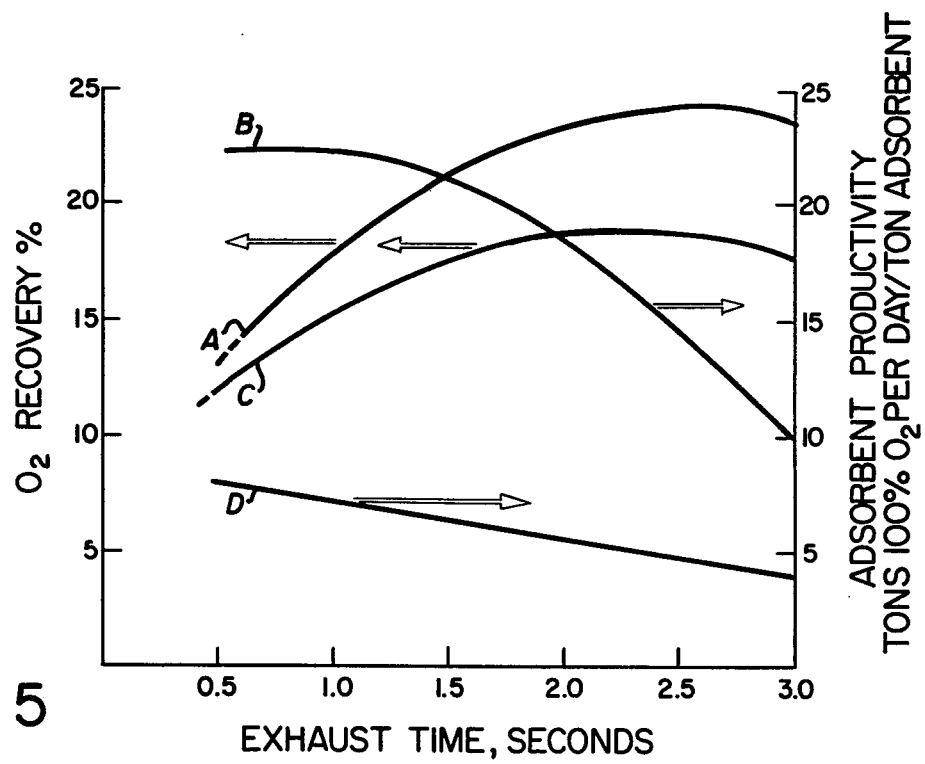
FIG. 5 is a graph showing the effect of exhaust time on oxygen recovery and adsorbent productivity for air separation in a 12 inch long bed with both 20 and 50 psig. feed for 0.3 seconds and 0.3 seconds flow suspension.

The reverse outward flow (exhaust) section of the cycle removes the desorbed one component by reverse flow of one component-depleted gas as purge. The product recovery rises rapidly as the exhaust time is increased but then decreases after a maximum recovery is reached. When the exhaust time is long enough to allow discharge of the product gas at the desired purity, the adsorbent productivity decreases and the product recovery increases. The effect of exhaust time on oxygen recovery and zeolite 5A adsorbent productivity is illustrated in the graph of FIG. 4 based on operation of a 60 inch long adsorbent bed processing feed air at 50 psig. with 0.5 second feed gas introduction and a flow suspension period which maximizes oxygen recovery. A 2250 ml. product surge tank was used. The effect of exhaust time on oxygen recovery and zeolite 5A adsorbent productivity in a relatively short (0.68 inch I.D. × 12 inches long) adsorbent bed is also shown in FIG. 5 at two air feed pressures, 50 psig. (curves A and B) and 20 psig. (curves C and D). The feed and delay times were each 0.3 seconds at both pressure levels.

Figure 1:
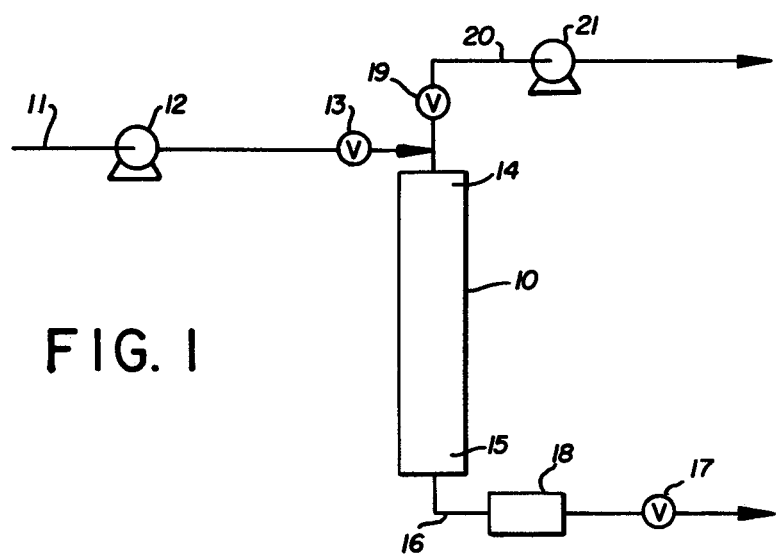
FIG. 1 is a schematic drawing of apparatus suitable for practicing the rapid pressure swing adsorption pressure process of this invention.

The preferred flow suspension or delay portion of the cycle occurs immediately after the feed gas introduction and allows the pressure wave to penetrate further into the adsorbent bed before the exhaust portion is started. The effect of the flow suspension step is similar to a longer feed time but the former has the advantage of not introducing additional gas which would result from an increased feed gas introduction. A flow suspension of appropriate duration will result in both increased production and recovery of product gas over that achievable if flow suspension is not employed. However, the adsorbent productivity resulting from a flow suspension which maximizes product recovery may be slightly less than if a shorter flow suspension period is used. It should be noted, however, that the effect of flow suspension is minor compared to the effects of feed gas introduction and reverse outward flow portions of the cycle. The flow suspension period should be less than 10 times the feed gas introduction period and also less than one-half the reverse outward flow period. The effect of the flow suspension period over a wide range of cycle times in the practice of this invention for air separation to produce 90 mole percent oxygen product using the apparatus schematically shown in FIG. 1 is shown in Table B. The data is based on a 60 inch long cylindrical 3 inch diameter column of zeolite 5A using feed air at 50 psig. with a product surge tank volume of 2250 ml.

Table B demonstrates the effect of the flow suspension-reverse outward flow time relationship on product recovery, in particular the 0.5, 2.0, 5.0 and 0.5, 3.0, 5.0 cycles. The former is an embodiment of this invention and provided 24.0% $O_2$ recovery whereas the latter, with a flow suspension period exceeding one-half the reverse outward flow period, provided only 15.5% $O_2$ recovery. The same effect, though less pronounced, is demonstrated by the 1.0, 2.0, 5.0 and 1.0, 3.0, 5.0 cycles.

TABLE B

| | Effect Of Flow Suspension On Product Recovery | |
|---|---|---|
| Timer Cycle* (sec) | Product Flow Rate (1+/hr) | Oxygen Recovery (%) |
| 0.5,0.5,5.0 | 368 | 23.8 |
| 0.5,1.0,5.0 | 345 | 24.3 |
| 0.5,2.0,5.0 | 301 | 24.0 |
| 0.5,3.0,5.0 | 148 | 15.5 |
| 1.0,0.5,5.0 | 453 | 22.6 |
| 1.0,1.0,5.0 | 435 | 22.9 |
| 1.0,2.0,5.0 | 245 | 16.8 |
| 1.0,3.0,5.0 | 236 | 16.3 |
| 0.5,0.5,10.0 | 249 | 28.6 |
| 0.5,1.0,10.0 | 250 | 29.2 |
| 0.5,2.0,10.0 | 245 | 30.2 |
| 0.5,3.0,10.0 | 231 | 30.9 |
| 1.0,0.5,10.0 | 328 | 26.0 |
| 1.0,1.0,10.0 | 329 | 27.1 |
| 1.0,2.0,10.0 | 305 | 26.6 |
| 1.0,3.0,10.0 | 328 | 27.4 |
| 1.5,0.5,10.0 | 365 | 24.6 |
| 1.5,1.0,10.0 | 359 | 25.0 |
| 1.5,2.0,10.0 | 334 | 24.8 |
| 1.5,3.0,10.0 | 313 | 24.7 |
| 0.5,1.0,15.0 | 194 | 32.7 |
| 0.5,2.0,15.0 | 191 | 32.0 |
| 0.5,3.0,15.0 | 175 | 30.9 |
| 1.0,0.5,15.0 | 247 | 27.7 |
| 1.0,1.0,15.0 | 256 | 28.7 |

TABLE B-continued

Effect Of Flow Suspension On Product Recovery

| Timer Cycle* (sec) | Product Flow Rate (1+/hr) | Oxygen Recovery (%) |
|---|---|---|
| 1.0,2.0,15.0 | 253 | 29.4 |
| 1.0,3.0,15.0 | 227 | 27.5 |
| 1.5,0.5,15.0 | 266 | 24.5 |
| 1.5,1.0,15.0 | 289 | 26.7 |
| 1.5,2.0,15.0 | 280 | 27.5 |
| 1.5,3.0,15.0 | 270 | 26.8 |
| 0.5,1.0,20.0 | 142 | 29.7 |
| 0.5,2.0,20.0 | 144 | 30.8 |
| 0.5,3.0,20.0 | 140 | 32.0 |
| 1.0,0.5,20.0 | 200 | 28.0 |
| 1.0,1.0,20.0 | 194 | 28.8 |
| 1.0,2.0,20.0 | 192 | 28.7 |
| 1.0,3.0,20.0 | 182 | 28.6 |
| 1.5,0.5,20.0 | 225 | 26.4 |
| 1.5,1.0,20.0 | 219 | 26.1 |
| 1.5,2.0,20.0 | 221 | 27.1 |
| 1.5,3.0,20.0 | 215 | 27.1 |

*Feed, Delay, Exhaust
' 0° C., 760 mm Hg

Table B also demonstrates the product recovery advantage of the 0.1-1 second feed gas introduction period, a preferred embodiment. The highest oxygen recoveries, i.e. those exceeding 30%, were achieved in the cycles employing a 0.5 second feed gas introduction period.

Figure 6:
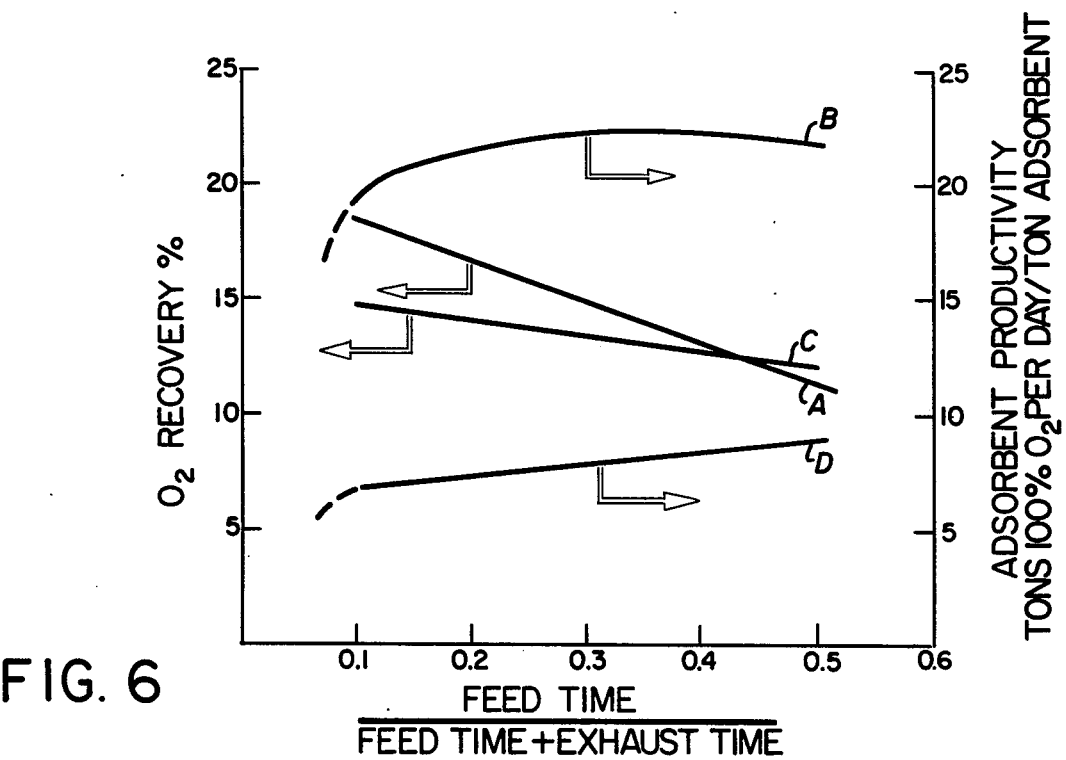
FIG. 6 is a graph showing the effect of the feed to exhaust time ratio on oxygen recovery and adsorbent productivity for air separation in a 12 inch long bed with both 20 and 50 psig. feed in a 1.3 second total cycle time including 0.3 second delay.

It will be apparent from FIGS. 2-5 that maximum product recovery is attained when the feed gas introduction period is less than about 20% of the feed plus exhaust time. This relationship is more clearly illustrated in the FIG. 6 graph based on a 0.68 inch I.D. × 12 inch long bed of zeolite 13X with a 150 ml. product surge tank, and 1.3 seconds total cycle time including 0.3 second delay. Curves A and B at 50 psig. feed air show that product recovery decreases linearly and with a substantial slope as the feed time/feed time plus exhaust time ratio ("feed time ratio") increases. However, there is very little improvement in adsorbent productivity as this time ratio increases from 0.1 to about 0.4. Accordingly, the time ratio should be relatively low and in the region where the product recovery is relatively high. Curves C and D are at 20 psig. feed air, and show that for short beds and relatively fast cycles the effect of the time ratio on product recovery and adsorbent productivity approximately balance each other.

Accordingly, the feed time ratio is preferably between 0.1 and 0.3 for this type of RPSA SYSTEM.

Figure 7:
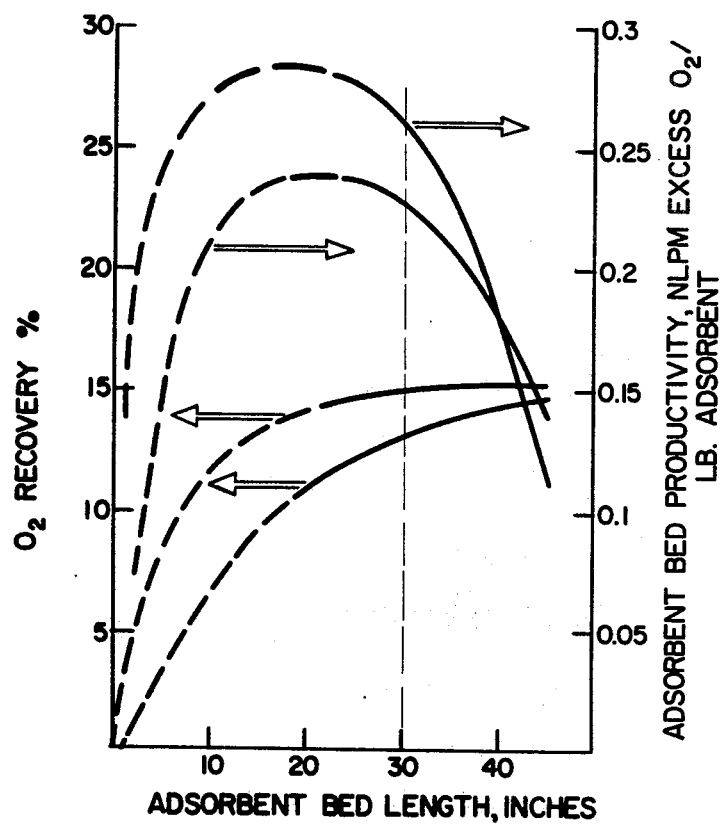
FIG. 7 is a graph comparing the oxygen recovery and adsorbent productivity at 10 psig air feed as functions of adsorbent bed length, for the RPSA processes of this invention and the prior art.
Figure 8:
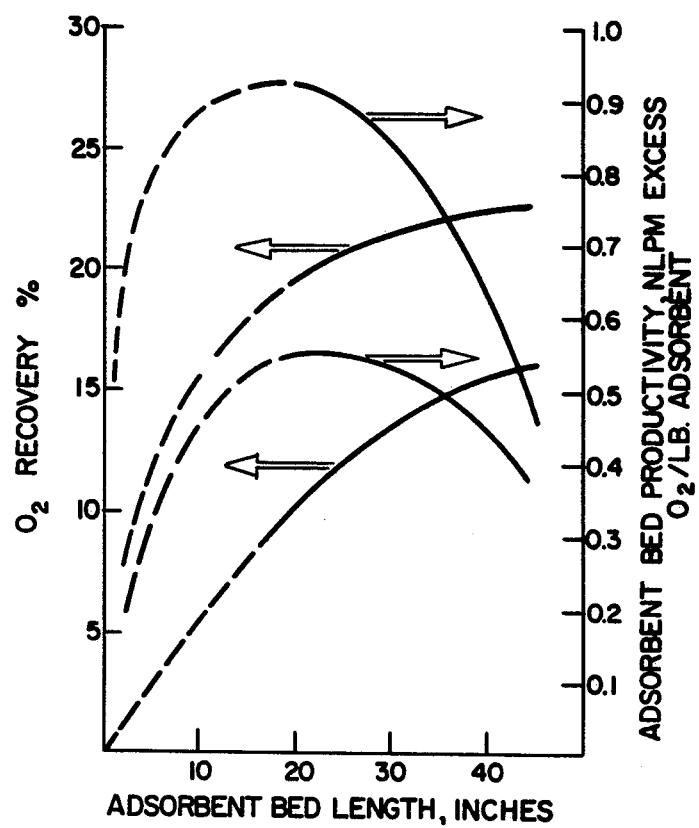
FIG. 8 is a graph comparing the oxygen recovery and adsorbent productivity at 30 psig. air feed gas as functions of adsorbent bed length, for the RPSA processes of this invention and the prior art.

The effect of adsorbent bed length on product recovery and adsorbent productivity for various RPSA processes is illustrated in FIG. 7 for 10 psig. feed air and in FIG. 8 for 30 psig. feed air, all with zeolite 5A adsorbent 40-80 mesh particle size range. The two time cycles are 1.0, 0.5, 4.0 seconds as representing the short feed-long exhaust time relationship of this invention, and 4.0, 0.5, 4.0 seconds representing the equal feed-exhaust time relationship of the Exxon prior art as described by Turnock. In FIG. 7 the upper productivity and oxygen recovery curves are for this invention and the lower curves are the prior art. This data illustrates the importance of the requirement of a bed length (in inches) not exceeding three times the difference between feed gas and reverse outward flow pressure (in psig.). Since the exhaust pressure is only slightly above 0 psig. the pressure difference is $(10-0)=10$ psig. and the bed length should not exceed 30 inches according to this relationship (shown by a vertical dash line). In the range of this upper limit oxygen recovery is essentially constant whereas adsorbent productivity has started to diminish sharply with increasing adsorbent bed length. However, at the 30 inch upper limit the adsorbent productivity is still substantially above the equal feed-exhaust time cycle of the prior art, i.e., about 0.26 l vs. 0.23 nlpm. excess oxygen per lb. adsorbent. As used herein, "excess oxygen" is the quantity of oxygen in excess of that which would be present if the feed stream were air containing 20.9% oxygen. Algebraically, excess oxygen may be expressed as the excess oxygen flow rate E in an oxygen enriched air stream flowing at F scfm. and containing Y present oxygen ($Y>20.9\%$) as follows; $E=F(Y-20.9)/79.1$ scfm.

The upper recovery and adsorbent productivity curves of FIG. 8 are for this invention and are superior to the prior art curves through the largest bed length used in these experiments-45 inches. It will be apparent however that a crossover point occurs for adsorbent productivity at about 50 inches and for this 30 psig. feed gas embodiment the maximum bed length of this invention $(3\times30$ psig.$)=90$ inches should not be used for best results.

Another series of tests using the FIG. 1 apparatus were conducted with crystalline zeolite molecular sieve adsorbent and air feed gas to demonstrate the effect of bed length at still higher pressure than the tests of FIGS. 7 and 8. The air feed gas was provided at 50 psig. to beds of 40-80 mesh particle size and substantially identical distribution with lengths of 12, 40 and 60 inches length. The results of these tests are summarized in Table C and show that unlike the lower feed pressures, oxygen recovery is still increasing at the 60 inch bed length. However, productivity has decreased.

TABLE C

Effect Of Bed Length

| Column Length in. | Timer Cycle | Product Flow Rate at 90% $O_2$, liters/hr-in$^2$ cross-sect. area (Adsorbent Productivity) | % $O_2$ Recovery | Zeolite Adsorbent Type | Ratio of Product Surge Tank to Bed Volume | Bed Diam., in. | Surge Tank Vol., ml. |
|---|---|---|---|---|---|---|---|
| 12 | 0.3,0.3,2.97 | 60.6 | 20.8 | 5A | 2.1 | 0.68 | 150 |
| 12 | 0.3,0.3,2.95 | 68.9 | 25.1 | 13X | 2.1 | 0.68 | 150 |
| 40 | 0.5,2.0,15 | 20.8 | 27.3 | 5A | 0.46 | 3.07 | 2250 |
| 60 | 0.5,1.0,15 | 26.3 | 32.7 | 5A | 0.31 | 3.07 | 2250 |

Figure 9:
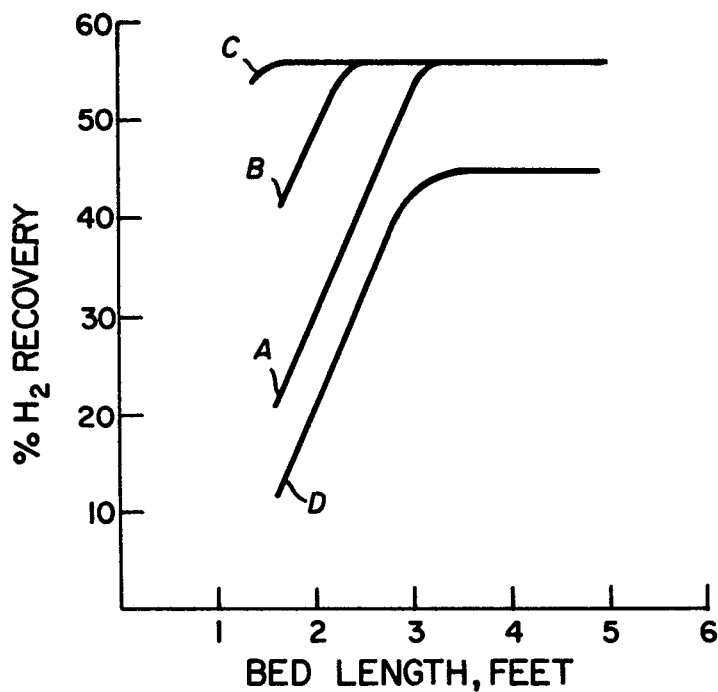
FIG. 9 is a graph showing the effect of bed length, feed time and feed pressure on hydrogen recovery in RPSA processes of this invention and the prior art, for feed gas containing Ar, $CH_4NH_3$ and $N_2$ impurities.

The effects of bed length, cycle time and feed pressure were illustrated in another series of tests employing a feed gas mixture (on a molar basis) of 62.5% $H_2$, 20.7% $N_2$, 6.0% Ar, 8.7% $CH_4$ and 2.1% $NH_3$. Feed pressures of 50, 250 and 400 psig. were used in 0.436 inch inside diameter columns of varying length with 40-80 mesh activated carbon adsorbent, and the data is shown in the graph of FIG. 9 with the following identification:

| Curve No. | Feed Press. Psig. | % H₂ in Prod | Cycle Feed | Delay | Exhaust |
|---|---|---|---|---|---|
| A | 400 | 90 | 0.5 | 0.5–1.5 | 4.0 |
| B | 250 | 90 | 0.5 | 0.5 | 4.0 |
| C | 50 | 90 | 0.5 | 0.5 | 4.0 |
| D | 400 | 80 | 4.0 | 0.1 | 4.0 |

In general this data shows substantially superior hydrogen recovery for the short feed-long exhaust cycle of this invention as compared with the equal feed-exhaust cycle of the prior art. By way of illustration, at 3.25 feet bed length the hydrogen recovery at 400 psig. for the RPSA process of this invention (curve A) is about 56% whereas the corresponding prior art hydrogen recovery (curve D) is about 45%. The short feed-long exhaust curves at 50 psig. (curve C) and 250 psig. (curve B) reach a maximum of 56% $H_2$ recovery, so that the latter is relatively independent of feed gas pressure. However, the adsorbent bed length needed to achieve this maximum recovery is pressure dependent, increasing as the feed pressure is increased.

In general the above air separation data indicates that for a 40-80 mesh particle size adsorbent, productivity is highest with the shortest bed length and gradually diminishes with increasing bed length whereas product recovery gradually increases from the smallest bed length to a maximum in beds of the 40 to 60 inch length range. There is no further improvement in longer columns such as up to 96 inches. Since adsorbent productivity diminishes beyond a 40 inch length without increase in product recovery, there is no advantage in using relatively long beds and in fact for 20-60 psig. air feed pressure a bed length of 15-30 inches is preferred for high productivity and a bed length of 3—5 feet is preferred for maximum recovery whereas the adsorbent bed length for the medical oxygen embodiment operating at 8-15 psig. air feed pressure is preferably 15-30 inches. Although not shown in the above data, other air separation experiments have demonstrated that the feed gas introduction period which maximizes product recovery increases as the adsorbent bed length is increased using a fixed adsorbent particle size. It has also been observed that as the feed gas pressure is increased, the bed length which maximizes adsorbent productivity at maximum recovery increases if the adsorbent particle size is kept constant.

The lower limit on adsorbent bed length in the above-described preferred embodiments is based on the length needed to achieve higher product recovery. The trend toward lower recovery in shorter beds is illustrated by the Table C data and in particular the 12 inch long beds.

The particle size of the adsorbent influences both mass transfer and flow resistance. Increasing the mass transfer by reducing the adsorbent particle size tends to increase both the product purity and the adsorbent productivity. However, flow resistance is also increased by a reduction in adsorbent particle size which tends to decrease the productivity at a given purity in the product stream. Since the rate of gas flow through the adsorbent bed is increased as the particle size is increased, the optimum total cycle time for a particular adsorbent bed is shortened. Also the optimum adsorbent bed length is increased as the adsorbent particle size is increased. If mass transfer was so rapid that the gas and the adsorbent were essentially at equilibrium, the optimum adsorbent particle size would be as large as possible to minimize flow resistance. However, at larger and larger adsorbent particle size, the assumption of equilibrium is progressively and increasingly unwarranted, so that an optimum adsorbent particle size exists for each embodiment of the invention. It should also be noted that for a given bed length adsorbent particle size sets the pressure drop through the bed, and a moderate pressure drop is required to operate the RPSA system. The effect of adsorbent particle size in the same overall column configuration is illustrated in the following Table D wherein air was separated using crystalline zeolite Molecular Sieve 5A. In these tests the adsorbent bed was reduced in cross-sectional area from the feed inlet end to the opposite end, i.e., tapered. In particular, there were three sections of 3, 1.5 and 1 inch diameter to more effectively utilize the adsorbent (increase productivity) based on the progressively reduced feed gas flow from end-to-end. It will also be recognized that the bed cross-sectional area may be continuously reduced rather than in discrete steps. In one preferred embodiment of this invention to increase productivity, the cross-sectional area of the adsorbent bed is smaller at the second end than at the first end.

TABLE D
Effect Of Adsorbent Particle Size

| Adsorbent Size: | 1/16 in. pellets |
| Adsorbent Bed Size: | 3, 1.5, and 1 in. diameter, 15 in. deep |
| Adsorbent Bed Weight: | 1076, 428, 155 gm. |

| Timer Cycle (sec) | Flowrates (l/hr) Feed | Product | Exhaust | Mol % O₂ in Product | Oxygen Recovery (%) |
|---|---|---|---|---|---|
| Feed Pressure = 10 psig. | | | | | |
| .75, 0, 6.75 | 2354 | 32 | 2560 | 49.0 | 3.3 |
| .5, 0, 4.5 | 3075 | 36 | 3039 | 46.5 | 2.7 |
| Feed Pressure = 30 psig. | | | | | |
| .75, 0, 6.75 | 5777 | 35 | 5742 | 50.0 | 1.5 |
| .5, 0, 4.5 | 6975 | 36 | 6939 | 43.6 | 1.2 |
| Feed Pressure = 50 psig. | | | | | |
| 1.5, 2, 9 | 8353 | 98 | 8255 | 43.4 | 2.5 |
| 0.9, 1.2, 5.4 | 7656 | 94 | 7562 | 40.6 | 2.5 |
| 0.9, 1.2, 5.4 | 7617 | 34 | 7583 | 40.8 | 0.9 |
| 1, 0, 9 | 7093 | 36 | 7057 | 45.3 | 1.1 |
| 0.75, 0, 6.75 | 8210 | 46 | 8164 | 44.0 | 1.2 |
| 0.5, 0, 4.5 | 9972 | 39 | 9933 | 40.5 | 0.8 |

| Adsorbent Size: | 16 to 40 mesh |
| Adsorbent Bed Size: | 3, 1.5, and 1 in. diameter, 15 in. deep |
| Adsorbent Bed Weight: | 1204, 461, 172 gm. |
| Timer Cycle: | 1 1/2, 2, 9 sec. |

| Feed Pressure (psig) | Flow Rates (l/hr) Feed | Product | Exhaust | Mol % O₂ in Product | Oxygen Recovery (%) |
|---|---|---|---|---|---|
| 10 | 1647 | 32 | 1615 | 56.0 | 5.4 |
| 20 | 3405 | 49 | 3356 | 75.1 | 5.4 |
| 20 | 3450 | 39 | 3411 | 77.3 | 4.4 |
| 30 | 4793 | 58 | 4735 | 77.4 | 4.7 |
| 30 | 4784 | 44 | 4740 | 80.6 | 3.7 |
| 40 | 5962 | 57 | 5905 | 76.3 | 3.6 |
| 40 | 5934 | 38 | 4896 | 81.0 | 2.6 |

| Adsorbent Size: | 40-80 mesh |
| Adsorbent Bed Size: | 3, 1.5, and 1 in. in diameter, each section 15 inches deep (total length) |
| Adsorbent Bed Weight: | Not measured, but total weight estimated to be 1585 gm. |
| Timer Cycle: | 1 1/2, 2, 9 sec. |

| Feed Pressure (psig) | Flow Rates (l/hr) Feed | Product | Exhaust | Mol % O₂ in Product | Oxygen Recovery (%) |
|---|---|---|---|---|---|
| 10 | 1138 | 47 | 1075 | 68.0 | 14.2 |
| 10 | 1141 | 39 | 1102 | 73.9 | 12.6 |
| 10 | 1122 | 31 | 1107 | 88.2 | 12.0 |

TABLE D-continued

Effect Of Adsorbent Particle Size

| 20 | 2277 | 109 | 2168 | 78.2 | 18.7 |
|---|---|---|---|---|---|
| 20 | 2299 | 86 | 2213 | 89.8 | 16.8 |
| 20 | 2388 | 75 | 2313 | 92.7 | 14.6 |
| 30 | 3333 | 167 | 3166 | 82.3 | 20.6 |
| 30 | 3307 | 159 | 3148 | 86.1 | 20.7 |
| 30 | 3330 | 137 | 3193 | 91.8 | 18.9 |
| 30 | 3391 | 107 | 3284 | 93.6 | 14.8 |

Adsorbent Size: 40 to 60 mesh (57.7%), 60 to 80 mesh (26.4%), 80 to 100 mesh (15.9%)
Adsorbent Bed Size: 3, 1.5 and 1 in. in diameter, 15 in. deep
Adsorbent Bed Weight: 1004, 414, 155 gm.

| Timer Cycle (sec) | Flowrates (l/hr) | | | Mol % $O_2$ in Product | Oxygen Recovery (%) |
|---|---|---|---|---|---|
| | Feed | Product | Exhaust | | |
| Feed Pressure = 20 psig | | | | | |
| 4, 0, 8.5 | 2345 | 114 | 2231 | 68.8 | 16.7 |
| 2, 2, 8.5 | 2066 | 98 | 1968 | 74.0 | 17.6 |
| Feed Pressure = 30 psig | | | | | |
| 1.5, 2.5, 8.5 | 2803 | 118 | 2685 | 88.2 | 18.6 |
| Feed Pressure = 50 psig | | | | | |
| 3, 5, 17 | 2660 | 211 | 2449 | 67.1 | 26.6 |
| 1, 3, 21 | 2251 | 110 | 2141 | 91.5 | 22.4 |
| 2.04, 2.72, 12.24 | 3420 | 209 | 3211 | 81.8 | 25.0 |
| 0.5, 3, 13.5 | 2869 | 130 | 2739 | 91.2 | 20.7 |
| 1.5, 2, 9 | 4466 | 216 | 4250 | 86.1 | 20.8 |
| 1.2, 1.6, 7.2 | 5133 | 217 | 4916 | 86.7 | 18.3 |
| 0.9, 1.2, 5.4 | 5958 | 225 | 5733 | 86.3 | 16.3 |
| 0.6, 0.8, 3.6 | 6864 | 224 | 6640 | 84.9 | 13.9 |

This data shows that for air separation, 1/16 inch pellets give much poorer results in terms of oxygen recovery than the 40-80 mesh particle size range. The data also shows that 16-40 mesh particles are inferior as well as mixtures containing about 16% percent by weight 80-100 mesh adsorbent particles. It is apparent that the use of an appreciable quantity of particles smaller than 40-80 mesh decreases both the quantity of oxygen that can be produced in a particular adsorbent bed (adsorbent productivity) and the percent of oxygen in the feed gas that is recovered in the product stream (product recovery). Additional experiments using various size distributions within the 40-80 mesh particle range indicate that there is no significant difference between beds comprising 25% and 35% by weight of 60-80 mesh particles. However, a bed containing only 13% by weight of 60-80 mesh particles performs substantially poorer than a bed containing 25% by weight of 60-80 mesh particles. Ideally it would be preferred to use spherical particles of a very narrow diameter range, but the bed resistance would vary greatly with small changes in diameter. For oxygen production it is more practical to vary the bed resistance by varying the percent of 60-80 mesh particles instead of small changes in the entire particle distribution. For these reasons an adsorbent bed contaning 25-35% by weight 60-80 mesh adsorbent particles with the rest being 40-60 mesh particles is preferred for air separation for the specified bed lengths.

As previously stated, this invention requires adsorbent particles smaller than 20 mesh but larger than 120 mesh. It should be recognized however that small quantities of particles outside this range may be used as long as the overall bed permeability is substantially the same as an adsorbent bed having all particles within the 20-120 mesh range.

Feed gas pressure is one of the important parameters of this invention and must be at least 8 psig. for effective separation of gas mixtures in a rapid pressure swing adsorption system. Feed gas pressure is closely related to other process characteristics to achieve high product recovery. In general and with all other parameters held constant, if feed pressure is increased then the adsorbent particle size should be reduced. The same is true of the feed gas introduction period, that is, shorter periods should be used with increasing feed gas pressure. Conversely, if feed pressure is increased the adsorbent bed length should also be increased. A series of tests using air feed gas pressures of 10, 20 and 50 psig. were performed in a FIG. 1 type system using optimized bed lengths and cycle times for maximum productivity at the maximum attainable recovery for the applicable feed pressure with 40-80 mesh zeolite 5A adsorbent. The data from these tests is summarized in Table E and shows that both oxygen productivity and recovery increase with increasing pressure. Thus, the compression advantages of low-pressure operation must be carefully weighed against the disadvantages of much larger columns and adsorbent inventories at low pressures.

TABLE E

Effect Of Feed Pressure

| Feed Pressure, psig | Timer Cycle Sec. | Bed Length, in | Productivity, Liters of 90% $O_2$/hr-gm Adsorbent | % $O_2$ Recovery | Surge Tank Vol., ml | Bed Diam., in. | Ratio of Product Surge Tank to Bed Volume | Pressure Swing in Surge Tank, psig |
|---|---|---|---|---|---|---|---|---|
| 10 | 1,1,6 | 20 | 0.023 | 12.8 | 2250 | 6.07 | 0.24 | 1.5-4.5 |
| 20 | 0.5, 2.0,12 | 40 | 0.022 | 24.5 | 2250 | 3.07 | 0.46 | 3-5 |
| 50 | 0.5, 1.0,15 | 60 | 0.055 | 32.7 | 2250 | 3.07 | 0.31 | 3.5-6 |

Figure 10:
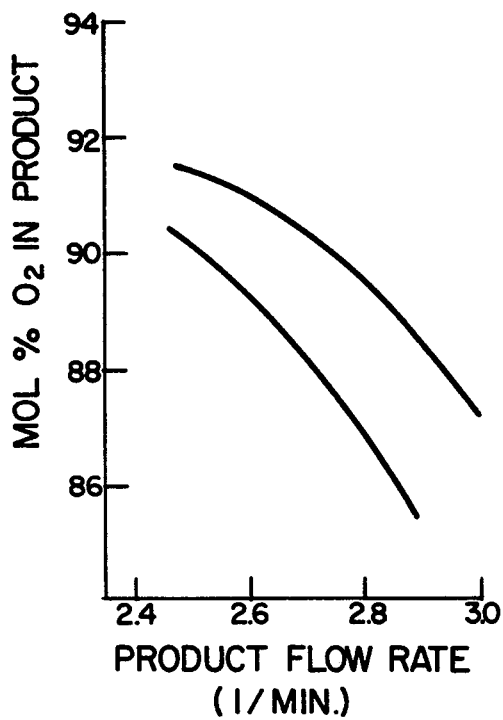
FIG. 10 is a graph showing the effect of ambient temperature on the relationship between product flowrate and product purity for the air separation in a 19-inch long bed with 10 psig. feed.

It is desirable to practice the air separation process of this invention at relatively low ambient temperatures as the adsorbent capacity decreases with increasing temperatures. This effect is illustrated by the two curves of FIG. 10. The tests represented therein were performed with a 6-inch diameter and 19-inch long bed of 40 to 80 mesh particle size calcium zeolite A at 10 psig. feed air. The upper curve was at ambient temperature of 22° C. and the lower curve at ambient temperature of 39° C.

This invention may be practiced with any adsorbent which is selective for the one or more components to be removed from the feed gas mixture and different types of crystalline zeolitic molecular sieves have been used in air separation embodiments. In addition to the commonly used zeolite 5A (a partially calcium exchanged form described in Milton U.S. Pat. No. 2,882,243), zeolite 13X is also especially suitable (a large pored sodium cationic form described in Milton U.S. Pat. No. 2,882,244). This is demonstrated in the tests of Table F using an adsorbent bed 5 inches in diameter and 20 inches long. It will be noted from this data that the 50 psig. feed pressure runs illustrate a high recovery at high enrichment embodiment of the invention for the practice of air separation.

TABLE F

| | Different Adsorbents | | | | | | |
|---|---|---|---|---|---|---|---|
| Cycle Time (sec) (Feed/Delay/Exhaust) | 1.0/4.0 | 1.25/3.75 | 1.0/3.5 | 1.0/3.0 | 1.0/2.5 | 0.5/2.0/15 | 1.0/2.0/15 |
| Feed Pressure, psig | 10 | 10 | 10 | 10 | 10 | 50 | 50 |
| Bed Diameter, in. | 5.05 | 5.05 | 5.05 | 5.05 | 5.05 | 6.07 | 6.07 |
| Bed Length, in. | 20 | 20 | 20 | 20 | 20 | 40 | 40 |
| Product Surge Tank Volume, ml | 2250 | 2250 | 2250 | 2250 | 2250 | 2250 | 2250 |
| 5A Zeolite (Pellet Form) | | | | | | | |
| Product Flow Rate (1*/hr) | 125 | 130 | 134 | 138 | 143 | 154 | — |
| Oxygen Recovery (%) | 10.4 | 10.3 | 10.0 | 9.4 | 8.9 | 27.3 | — |
| 13X Zeolite (Bead Form) | | | | | | | |
| Product Flow Rate (1*/hr) | 117 | 133 | 128 | 127 | 139 | 170 | 228 |
| Oxygen Recovery (%) | 10.6 | 11.6 | 11.0 | 10.6 | 10.5 | 30.0 | 28.3 |

*0° C., 760 mm Hg. and 90 mol. % oxygen

As previously indicated, the process of this invention is useful in separation of a gas mixture comprising 65 to 90% by volume ethylene with the balance being either nitrogen or hydrogen. A series of experiments were performed using gas mixtures containing 65 mole % ethylene - 35 mole % nitrogen, 65 mole % ethylene - 35 mole % hydrogen, and 90 mole % ethylene - 10 mole % nitrogen. In each instance the feed gas pressure was 50 psig and the adsorbent comprised carbon in a 4 foot long bed with a 150 cc. surge tank on the product end. Whereas in the air separation embodiment the oxygen discharged at the second end usually comprises the desired product, in these embodiments the ethylene discharged at the first end during the flow reversal or exhaust step is the desired product, and the nitrogen discharged at the first end is usually discarded. The tests using feed gases containing 65 mole percent ethylene are summarized in the following tables G and H.

TABLE G

| Feed Composition: | $C_2H_4$ = 65 Mol %, $N_2$ = 35 Mol % |
|---|---|
| Adsorbent Size: | 28–60 mesh carbon |
| Adsorbent Bed Size: | ¾ in. diameter, 4 feet long |
| Adsorbent Bed Weight: | 124.8 gms |
| Inlet Pressure: | 50 psig |

| Timer Cycle* (Sec) | Flow Rates (CFH+) | | | Mol % $C_2H_4$ In Product | Nitrogen Recovery (%) |
|---|---|---|---|---|---|
| | Feed | Product | Exhaust | | |
| Adsorbent Bed Temperature = 30° C. | | | | | |
| 0.5,1.0,5.0 | 16.821 | 5.067 | 11.754 | 21.2 | 67.8 |
| 0.5,1.0,5.0 | 18.534 | 5.131 | 13.403 | 19.8 | 63.4 |
| 0.5,1.0,5.0 | 17.922 | 4.493 | 13.429 | 15.9 | 60.2 |
| 0.5,1.0,5.0 | 18.420 | 3.829 | 14.591 | 9.6 | 53.7 |
| 0.5,1.0,5.0 | 18.298 | 2.786 | 15.512 | 4.1 | 41.7 |
| 0.5,1.0,5.0 | 17.808 | 2.168 | 15.640 | 1.8 | 34.1 |
| 0.5,2.0,5.0 | 15.772 | 1.748 | 14.024 | 1.3 | 31.2 |
| Adsorbent Bed Temperature = 50° C. | | | | | |
| 0.5,1.0,5.0 | 17.323 | 5.637 | 11.686 | 23.9 | 70.8 |
| 0.5,1.0,5.0 | 17.863 | 4.646 | 13.217 | 15.9 | 62.5 |
| 0.5,1.0,5.0 | 17.749 | 3.129 | 14.620 | 5.2 | 47.7 |
| 0.5,1.0,5.0 | 16.891 | 1.750 | 15.141 | 0.5 | 29.4 |

*Feed, Delay, Exhaust
 0° C., 760 mm Hg

TABLE H

| Feed Composition: | $C_2H_4$ = 65 Mol %, $H_2$ = 35 Mol % |
|---|---|
| Adsorbent Size: | 28–60 mesh carbon |
| Adsorbent Bed Size: | ¾ in. diameter, 4 feet long |
| Adsorbent Bed Weight: | 124.8 gm |
| Inlet Pressure: | 50 psig |

| Timer Cycle (sec) | Flow Rates (cfh+) | | | Mol % $C_2H_4$ In Product | Hydrogen Recovery (%) |
|---|---|---|---|---|---|
| | Feed | Product | Exhaust | | |
| Adsorbent Bed Temperature = 30° C. | | | | | |
| 0.5,1.0,5.0 | 18.438 | 8.308 | 10.130 | 44.0 | 72.1 |
| 0.5,1.0,5.0 | 19.647 | 5.754 | 13.893 | 19.6 | 67.3 |
| 0.5,1.0,5.0 | 20.202 | 4.873 | 15.329 | 12.5 | 60.3 |
| 0.5,1.0,5.0 | 20.766 | 4.107 | 16.658 | 8.0 | 52.0 |
| 0.5,1.0,5.0 | 20.268 | 3.769 | 16.499 | 5.9 | 50.5 |
| 0.5,1.0,5.0 | 21.025 | 2.816 | 18.206 | 1.3 | 37.7 |
| 0.5,2.0,5.0 | 16.840 | 3.186 | 13.654 | 6.6 | 50.9 |
| 0.5,1.0,10.0 | 10.923 | 2.022 | 8.901 | 5.5 | 50.0 |
| 0.5,2.0,10.0 | 10.153 | 2.079 | 8.074 | 6.6 | 54.7 |
| 0.5,2.0,10.0 | 10.015 | 1.666 | 8.349 | 4.1 | 45.6 |
| Adsorbent Bed Temperature = 50° C. | | | | | |
| 0.5,1.0,5.0 | 18.228 | 7.195 | 11.033 | 34.4 | 74.0 |
| 0.5,1.0,5.0 | 18.324 | 6.847 | 11.528 | 30.0 | 74.5 |
| 0.5,1.0,5.0 | 18.856 | 5.076 | 13.780 | 16.2 | 64.5 |
| 0.5,1.0,5.0 | 19.395 | 4.824 | 14.571 | 12.3 | 62.3 |
| 0.5,1.0,5.0 | 20.470 | 3.946 | 16.524 | 6.4 | 51.5 |
| 0.5,1.0,5.0 | 19.794 | 2.102 | 17.692 | 0.7 | 30.1 |

*Feed, Delay, Exhaust
 0° C., 760 mm Hg

Figure 11:
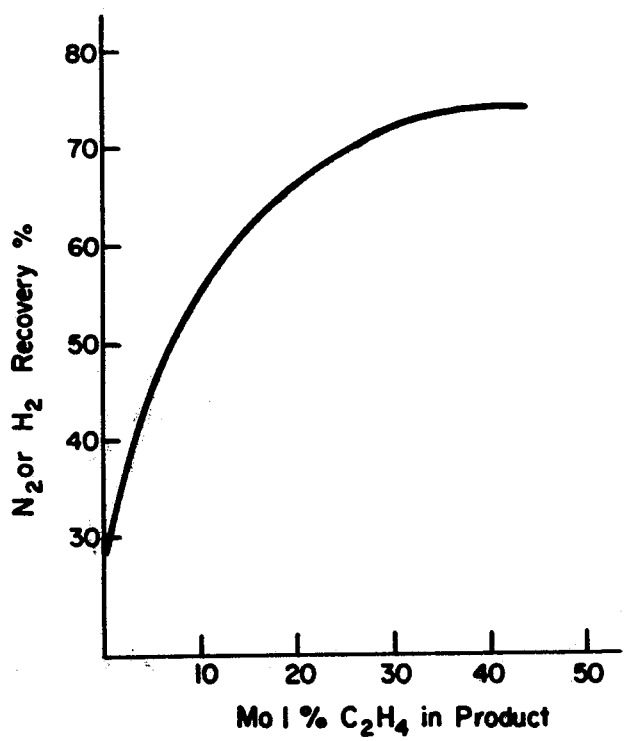
FIG. 11 is a graph showing the effect of product $C_2H_4$ purity on recovery from mixtures of $N_2$-$C_2H_4$ and $H_2$-$C_2H_4$ respectively.

The above data is summarized in the graph of FIG. 11, with $N_2$ or $H_2$ recovery plotted as a function of mole % $C_2H_4$ in the product gas. Since the data for nitrogen and hydrogen are so similar, they may be shown on the same curve. Unlike the air separation embodiment, the feed gas temperature does not appear to affect the performance of the system significantly, possibly due to the shape of the ethylene adsorption isotherms. The data and FIG. 11 show that $N_2$ or $H_2$ recovery increases almost linearly with increasing $C_2H_4$ in the product up to about 10 mol % and thereafter the slope diminishes and maximum recovery is reached at about 30 mol % $C_2H_4$. Tables G and H also illustrate the effect of decreasing product ($N_2$ or $H_2$) flow rate on product purity and recovery. With the same time cycle, progressively decreasing the product flow rate (productivity) increases the product purity but decreases recovery.

The 90 mole % ethylene feed gas data is shown in the following Table I.

TABLE I

Feed Composition: $C_2H_4$ = 90 mol %, $N_2$ = 10 mol.%
Adsorbent: 30–60 mesh carbon, Weight: 64 gms.
Adsorbent Bed Size: ½ in. diameter. 4 feet long
Inlet Pressure: 50 psig, Adsorbent Temperature 23° C.

| Flow Rates (1*/hr) | | | Mol % $N_2$ in $N_2$-Enriched Stream | $C_2H_4$ Recovery (%) | $N_2$ Removal (%) |
|---|---|---|---|---|---|
| Feed | Product | Exhaust | | | |
| Timer Cycle: 0.55 sec feed, 1.0 sec delay, 5.0 sec exhaust | | | | | |
| 238 | 55.2 | 183 | 34.8 | 83.2 | 80.6 |
| 240 | 37.3 | 202 | 46.0 | 90.7 | 71.6 |
| 242 | 25.9 | 216 | 60.0 | 95.2 | 64.2 |

TABLE I-continued

| 241 | 17.4 | 223 | 73.6 | 97.9 | 53.4 |
|---|---|---|---|---|---|
| Timer Cycle: 0.55 sec feed, 0.7 sec delay, 7.0 sec exhaust | | | | | |
| 186 | 36.8 | 150 | 39.2 | 86.6 | 77.4 |
| 192 | 26.7 | 165 | 51.6 | 92.5 | 71.7 |
| 192 | 18.0 | 174 | 66.2 | 96.5 | 61.9 |

*0° C., 760 mm Hg

This invention is useful in the separation of hydrogen and carbon monoxide and in a preferred embodiment the adsorbent is crystalline zeolite between 20 and 60 mesh particle size, in a bed length of 2-5 feet. The feed gas introduction period is 0.1-1 seconds, the flow suspension period is less than 1.5 seconds and less than four times the feed gas introduction period. The reverse outward flow is 1.5 seconds and between three and ten times the feed gas introduction period. A series of tests using zeolite 5A in various particle size ranges was performed in a ¾ inch diameter, 4 feet long bed and a 70 cc. product surge tank to demonstrate the importance of adsorbent particle size. In these tests the feed gas was provided at 50 psig and the results are summarized in Table J for timing cycles that maximize product recovery. Experimental points are given in Table K.

TABLE J

| Feed Composition: | 46.38 mol % CO, 53.62 mol % $H_2$ |
|---|---|
| Hydrogen Product Purity: | 95 mol % |
| Inlet Pressure: | 50 psig |

| Adsorbent Particle Size (Mesh) | Adsorbent Productivity (ton of $H_2$/ton of adsorbent-day) |
|---|---|
| 40-80 | 1.5 |
| 30-60 | 1.9 |
| 20-40 | 2.4 |

The data in Table J shows that increasing the adsorbent particle size within the overall range of 20-80 mesh increased the adsorbent productivity without decreasing hydrogen recovery.

TABLE K

Hydrogen-Carbon Monoxide Separation

| Timer Cycle* (sec) | Flow Rates (cfh+) | | | Mol % CO in Product | Hydrogen Recovery (%) |
|---|---|---|---|---|---|
| | Feed | Product | Exhaust | | |
| With 20-40 mesh adsorbent particles: | | | | | |
| 0.5,1.0,5.0 | 18.926 | 5.949 | 12.977 | 5.6 | 55.3 |
| 0.5,2.0,5.0 | 16.251 | 5.014 | 11.237 | 5.6 | 54.3 |
| 1.0,1.0,5.0 | 26.454 | 7.308 | 19.146 | 5.1 | 48.9 |
| 1.0,2.0,5.0 | 22.530 | 6.270 | 16.259 | 5.0 | 49.2 |
| 2.0,1.0,5.0 | 32.404 | 6.809 | 25.595 | 5.0 | 37.2 |
| With 30-60 mesh adsorbent particles: | | | | | |
| 0.5,1.0,5.0 | 15.258 | 4.704 | 10.554 | 4.9 | 54.7 |
| 0.5,2.0,5.0 | 13.123 | 4.075 | 9.048 | 5.2 | 54.9 |
| 1.0,1.0,5.0 | 20.172 | 5.844 | 14.328 | 5.0 | 51.3 |
| 1.0,2.0,5.0 | 17.007 | 5.071 | 11.937 | 5.4 | 52.6 |
| 2.0,1.0,5.0 | 25.268 | 6.043 | 19.225 | 5.3 | 42.2 |
| With 40-80 mesh adsorbent particles: | | | | | |
| 0.5,1.0,5.0 | 11.029 | 3.124 | 7.905 | 6.95 | 49.2 |
| 1.0,1.0,5.0 | 13.313 | 3.589 | 9.724 | 4.27 | 47.9 |
| 2.0,2.0,5.0 | 12.231 | 3.527 | 8.704 | 5.4 | 50.9 |
| 2.5,2.0,5.0 | 12.372 | 3.559 | 8.813 | 5.5 | 50.7 |

*Feed, Delay, Exhaust
+ 0° C., 760 mm Hg

The above data shows that the feed time which maximizes hydrogen recovery decreases (as the adsorbent particle size increases) from 2 to about ½ second. The data further demonstrates the importance of a relatively short feed gas introduction period as compared with reverse outward flow period. By way of illustration and referring to the 20-40 mesh adsorbent particle bed, the hydrogen recovery is 37.2% when the reverse outward flow is 2½ times the feed gas introduction period, and the recovery is increased to 55.3% when the reverse outward flow period is 10 times the feed gas introduction period. Table K also demonstrates the productivity advantage of using a feed gas introduction period which does not exceed 1 second, and with 20-40 mesh particles this is accomplished wwithout loss of product recovery.

Figure 12:
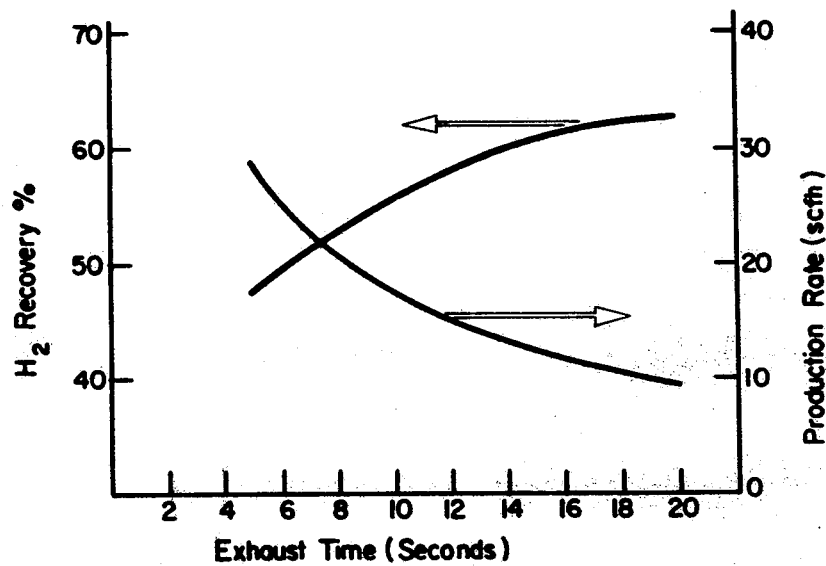
FIG. 12 is a graph showing the effect of exhaust time on $H_2$ recovery and adsorbent productivity for $H_2$-CO separation in a 48 inch long bed with 300 psig. feed for 0.5 seconds feed and 1.0 seconds delay.

In a preferred embodiment for separation of hydrogen-carbon monoxide gas mixtures by selective adsorption of carbon monoxide, the feed gas is introduced at 140-400 psig. and the reverse outward flow (exhaust) step is continued to atmospheric pressure. To demonstrate the effect of exhaust time, a series of tests were conducted using 49 mol. % $H_2$-51% CO feed gas at 300 psig., 0 psig. exhaust pressure and a 0.5 inch diameter bed of 40-80 mesh particle size zeolite 5A which was 48 inches long. A 150 cc. product surge tank was used. The results of these tests are shown in Table L and plotted in FIG. 12 with hydrogen recovery and adsorbent productivity plotted as functions of exhaust time for 0.5 second feed and 1.0 second delay.

TABLE L

Exhaust Time Effect in $H_2$-CO Separation

| Timer Cycle* (Sec) | Flow Rates (cfh+) | | | Mol % CO In Product | Hydrogen Recovery (%) |
|---|---|---|---|---|---|
| | Feed | Product | Exhaust | | |
| 0.5,1.0,5.0 | 28.53 | 6.63 | 21.90 | 2.4 | 46.3 |
| 0.5,1.0,5.0 | 28.70 | 6.18 | 22.52 | 1.4 | 43.3 |
| 0.5,1.0,5.0 | 28.72 | 5.84 | 22.88 | 1.0 | 41.1 |
| 0.5,1.0,7.0 | 22.89 | 6.67 | 16.22 | 4.75 | 56.6 |
| 0.5,1.0,7.0 | 23.20 | 6.40 | 16.80 | 3.55 | 54.3 |
| 0.5,1.0,7.0 | 23.25 | 6.06 | 17.19 | 2.5 | 51.9 |
| 0.5,1.0,7.0 | 23.40 | 5.83 | 17.57 | 1.9 | 49.9 |
| 0.5,1.0,8.0 | 20.65 | 5.42 | 15.23 | 2.0 | 52.5 |
| 0.5,1.0,9.0 | 18.73 | 5.10 | 13.63 | 2.0 | 54.5 |
| 0.5,1.0,10.0 | 17.67 | 5.33 | 12.34 | 4.55 | 58.2 |
| 0.5,1.0,10.0 | 17.34 | 5.06 | 12.28 | 3.35 | 57.6 |
| 0.5,1.0,10.0 | 17.33 | 4.84 | 12.49 | 2.0 | 55.9 |
| 0.5,1.0,10.0 | 17.49 | 4.88 | 12.61 | 2.1 | 55.8 |
| 0.5,1.0,10.0 | 16.98 | 4.63 | 12.35 | 1.8 | 54.7 |
| 0.5,1.0,12.0 | 14.55 | 4.37 | 10.18 | 2.2 | 60.0 |
| 0.5,1.0,15.0 | 12.30 | 3.71 | 8.59 | 2.1 | 60.3 |
| 0.5,1.0,15.0 | 12.31 | 3.70 | 8.61 | 2.1 | 60.0 |
| 0.5,1.0,15.0 | 12.32 | 3.46 | 8.86 | 0.9 | 56.8 |
| 0.5,1.0,20.0 | 9.45 | 2.96 | 6.49 | 1.9 | 62.7 |

*Feed, Delay, Exhaust
+ 0° C., 760 mm Hg

Table L demonstrates that exhaust time may be controlled to maximize product recovery or adsorbent productivity in the practice of this invention. If the practitioner wishes to achieve maximum productivity at some loss in product recovery, the exhauste (reverse outward flow) time should not exceed 10 seconds. Conversely, if one wishes to obtain maximum product recovery at the expense of productivity (product flow rate) the exhaust time should be greater than 10 seconds but such that the total cycle time does not exceed 30 seconds.

It will be apparent that relatively high recovery and reasonable productivity is obtained when the exhaust time is between 10 and 20 seconds, i.e., between 20 and 40 times the feed gas introduction period.

In another preferred embodiment, to maximize product recovery the pressure during reverse outward flow does not exceed 0 psig. although a higher exhaust pressure may in some instances be dictated by the product end use.

The advantage of operating with an exhaust pressure of 0 psig. was illustrated in another series of tests using the same 49% $H_2$-51% CO feed gas in the same bed at 300 psig. in a time cycle of 0.5 second feed, 1.0 second delay, and 5.0 second exhaust. The exhaust pressure was 0, 30 and 60 psig. and the results are summarized in Table M.

TABLE M

Exhaust Pressure Effect in $H_2$-CO Separation

| Flow Rates (cfh+) | | | Mol % CO | Hydrogen |
|---|---|---|---|---|
| Feed | Product | Exhaust | In Product | Recovery (%) |
| Exhaust Pressure = 0 psig | | | | |
| Product Pressure = 1 psig | | | | |
| 29.93 | 7.80 | 22.13 | 5.20 | 50.4 |
| 29.84 | 7.30 | 22.81 | 3.15 | 46.5 |
| 29.90 | 6.63 | 23.27 | 2.30 | 44.2 |
| 30.18 | 5.89 | 24.29 | 1.00 | 39.4 |
| Exhaust and Product Pressure = 30 psig | | | | |
| 26.57 | 5.60 | 20.97 | 5.50 | 40.7 |
| 25.90 | 4.85 | 21.06 | 3.55 | 36.9 |
| 26.21 | 4.47 | 21.74 | 2.15 | 34.1 |
| Exhaust and Product Pressure = 60 psig | | | | |
| 23.23 | 4.73 | 18.50 | 8.6 | 38.0 |
| 23.65 | 3.94 | 19.71 | 4.50 | 32.5 |
| 23.24 | 4.15 | 19.09 | 6.25 | 34.2 |
| 24.19 | 2.77 | 21.42 | 0.50 | 23.3 |

+ 0° C., 760 mm Hg.

The invention is also suitable for separation of hydrogen-methane gas mixtures and a series of tests was conducted with a 50-50 (molar basis) mixture feed gas at 50 psig. inlet pressure using 28-60 mesh activated carbon adsorbent in a ¾-inch diameter bed 4 feet long. A 150 cc. product surge tank was used. In these tests, the timer cycle was varied in the same general manner as in the previously disclosed hydrogen-carbon monoxide feed gas tests, and the results are summarized in Table N.

TABLE N

Hydrogen-Methane Separation

| Timer Cycle* | Flow Rates (cfh+) | | | Mol % $CH_4$ In | Hydrogen Recovery |
|---|---|---|---|---|---|
| (sec) | Feed | Product | Exhaust | Product | (%) |
| 0.5,1.0,5.0 | 20.315 | 5.773 | 14.542 | 4.0 | 54.6 |
| 0.5,2.0,5.0 | 16.888 | 5.427 | 11.461 | 5.8 | 60.5 |
| 1.0,1.0,5.0 | 28.719 | 7.464 | 21.255 | 5.1 | 49.3 |
| 1.0,2.0,5.0 | 25.201 | 6.789 | 18.412 | 5.3 | 51.0 |
| 2.0,1.0,5.0 | 32.776 | 6.675 | 26.101 | 5.5 | 38.4 |

*Feed, Delay, Exhaust
+ 0° C., 760 mm Hg

The above data shows that for the hydrogen-methane separation, the hydrogen recovery for the 1, 1, 5 cycle was much higher than for the 2, 1, 5 cycle, i.e., 49.3% vs. 38.4%. This supports the preference for the reversed outward flow period between 3-40 times the feed gas introduction period for maximum recovery.

In a preferred embodiment the hydrogen-methane feed gas is provided at 140-500 psig. and the reverse outward flow (exhaust) step is continued to below 60 psig. and preferably atmospheric pressure before termination. To demonstrate the importance of the aforementioned 3:1 to 40:1 ratio of exhaust to feed time in this preferred embodiment, a series of tests were performed using 33.9% $CH_4$-66.1% $H_2$ feed gas and 60-100 mesh carbon particles in a ½ inch diameter, 48 inch long bed and a 150 cc. product surge tank. The results of these tests are summarized in Table 0.

TABLE 0

Exhaust to Feed Time Ratio In $H_2$—$CH_4$ Separation

| Timer Cycle* | Flow Rates (cfh+) | | | Mol % $CH_4$ In | Hydrogen Recovery |
|---|---|---|---|---|---|
| (Sec) | Feed | Product | Exhaust | Product | (%) |
| Exhaust and Product Pressure = 60 psig | | | | | |
| 1.0,2.0,5.0 | 39.03 | 10.62 | 28.41 | 4.90 | 39.4 |
| 1.0,2.0,5.0 | 40.46 | 8.27 | 32.19 | 1.93 | 30.0 |
| 1.0,1.0,5.0 | 47.24 | 11.31 | 35.93 | 2.75 | 35.4 |
| 0.5,2.0,5.0 | 30.13 | 8.13 | 22.0 | 2.9 | 39.8 |
| 0.5,2.0,5.0 | 30.85 | 6.42 | 24.3 | 0.65 | 30.4 |
| 0.5,1.0,5.0 | 35.2 | 8.17 | 27.0 | 0.95 | 35.0 |
| 0.5,1.0,5.0 | 35.4 | 8.13 | 27.33 | 1.0 | 34.6 |
| 0.5,1.0,15.0 | 12.91 | 4.04 | 8.86 | 4.25 | 45.4 |
| 0.5,1.0,10.0 | 19.40 | 5.59 | 13.81 | 2.50 | 42.5 |
| 0.5,1.0,7.0 | 26.71 | 7.37 | 19.33 | 1.90 | 41.0 |
| 0.5,1.0,5.0 | 34.97 | 9.19 | 25.78 | 1.75 | 39.1 |
| 0.5,1.0,3.0 | 49.84 | 12.85 | 36.99 | 2.30 | 38.1 |
| 0.5,1.0,2.0 | 61.03 | 15.88 | 45.15 | 3.5 | 38.0 |
| Exhaust and Product Pressure = 120 psig | | | | | |
| 1.0,2.0,5.0 | 35.35 | 5.62 | 29.73 | 3.60 | 23.2 |
| 1.0,1.0,5.0 | 40.95 | 7.40 | 33.55 | 4.10 | 26.2 |
| 0.5,2.0,5.0 | 26.43 | 3.84 | 22.59 | 1.70 | 21.6 |
| 0.5,1.0,5.0 | 30.01 | 5.54 | 24.47 | 3.55 | 26.9 |

*Feed, Delay, Exhaust
+ 0° C., 760 mm Hg

The effect of exhaust pressure on recovery was also illustrated in another series of tests using the same feed gas, with pressure of 350 psig. and 40-80 mesh carbon particles (but different type from those used in the immediately preceding tests) in the same ½ inch diameter, 48-inch long column and with the same product surge tank. The data summarized in Table P shows substantially higher hydrogen recovery at 0 psig. exhaust pressure as compared with 60 psig.

TABLE P

Exhaust Pressure In $H_2$—$CH_4$ Separation

| Timer Cycle* | Flow Rates (cfh+) | | | Mol % $CH_4$ In | Hydrogen Recovery |
|---|---|---|---|---|---|
| (Sec.) | Feed | Product | Exhaust | Product | (%) |
| Exhaust and Product Pressure = 60 psig | | | | | |
| 0.5,1.0,5.0 | 29.56 | 8.74 | 20.82 | 3.17 | 42.73 |
| 0.5,1.0,5.0 | 31.69 | 7.43 | 24.26 | 2.00 | 34.29 |
| 0.5,1.0,5.0 | 30.25 | 3.53 | 26.72 | 0.05 | 17.40 |
| Exhaust Pressure = 0 psig | | | | | |
| Product Pressure = 5 psig | | | | | |
| 0.5,1.0,5.0 | 40.15 | 18.36 | 21.99 | 4.33 | 65.30 |
| 0.5,1.0,5.0 | 41.58 | 16.73 | 24.85 | 2.10 | 58.79 |
| 0.5,1.0,5.0 | 41.52 | 14.95 | 26.58 | 0.95 | 53.27 |

*Feed, Delay, Exhaust
+ 0° C., 760 mm Hg

In another preferred embodiment, the RPSA process is used to purify steam reformer hydrogen containing as impurities, carbon dioxide, methane and carbon monoxide. The adsorbent is a homogeneous mixture of activated carbon and crystalline zeolite molecular sieve of at least 4 angstroms pore size and 40-80 mesh particle size in a bed length of 3-5 feet. The feed gas introduction period is 0.1-1 second, the period of the flow suspension step is less than 1.5 seconds and also less than four times the feed gas introduction period. The reverse outward flow period is 1-10 seconds and between three and twenty times the feed gas introduction period. The exhaust pressure is 0-60 psig. A series of experiments were performed which illustrate the suitability of this invention for steam reformer hydrogen purification, and the data is summarized in Table Q. It should be noted that substantially higher hydrogen recovery was obtained with the preferred adsorbent mixture as compared with activated carbon alone, i.e. 53.0% vs. 47.5%

TABLE Q

| Feed Composition: | 74.5% $H_2$, 21.0% $CO_2$, 2.5% CO, 2.0% $CH_4$ (mole basis) |
|---|---|
| Adsorbent Size: | 40–80 mesh |
| Adsorbent Bed: | 40 inches long and 0.44 inches diam. |
| Cycle: | 0.5 sec. feed, 1.0 sec. delay, 5.0 sec. exhaust |
| Product: | 99.999% $H_2$ |
| Product Surge Tank Vol: | 1900 cc. |

| Feed Pressure (psig.) | Exhaust Pressure (psig.) | Adsorbent | Hydrogen Recovery (%) |
|---|---|---|---|
| 250 | 0 | Activated carbon | 51.0 |
| 250 | 5 | " | 47.5 |
| 250 | 10 | " | 45.2 |
| 250 | 20 | " | 41.4 |
| 150 | 0 | " | 53.0 |
| 75 | 0 | " | 49.0 |
| 250 | 5 | Act.Car./5A Mol.Sieve | 53.0 |

A statistically designed set of experiments employing apparatus as schematically shown in FIG. 1 was used to illustrate the improvement afforded by this invention over the Turnock-Kowler prior art in terms of cycle times, using different feed gas pressures and adsorbent bed lengths and without a product surge tank. The feed gas in all experiments was 28.6 mol. % $N_2$ and 71.4% $CH_4$, the same composition used in the experiments described on pages 17–26 of Turnock P. A., "The Separation of Nitrogen and Methane by Pulsating Flow Through on Fixed, Molecular Sieve Bed", Ph.D. Thesis, University of Michigan, Dept. of Chemical and Metallurgical Engineering, 1968. Certain of the data from these experiments is shown in the FIG. 13 and 14 graphs, using 5A zeolite adsorbent particles in the 40–80 mesh range in a 0.62 inch bed diameter with the feed gas introduced at pressures between 10 and 30 psig. and 24° C. The product gas was 70 mol. % $H_2$ and 30% $CH_4$, and the exhaust pressure was 0 psig. The very fast cycle data is shown in the FIG. 13 graph and the longer cycle data is shown in the FIG. 14 graph. The bed lengths were all 30 inches the general trends also appeared in experiments based on 12-inch long beds. The cycle times for the four curves were as follows:

TABLE R

| | Cycles For Nitrogen-Methane Separation | | |
|---|---|---|---|
| | Cycle, Sec. | | |
| Curve | Feed | Delay | Exhaust |
| A | 0.2 | 0.3 | 1.8 |
| B | 1.0 | 0.3 | 1.0 |
| C | 1.0 | 0.3 | 9.0 |
| D | 5.0 | 0.3 | 5.0 |

Inspection of Table R shows that the delay time (0.3 secs.) was kept constant during this set, and the total cycle time for curves A and B was the same (2.3 secs.) as was the total cycle time for curves C and D (10.3 secs.). Accordingly, the two pairs may be directly compared and they show that the $N_2$ recovery was higher at 30 psig. for both curves A and C (short feed-long exhaust time) as compared with curves B and D (equal feed-exhaust time), demonstrating improvement obtainable with this invention.

Figure 13:
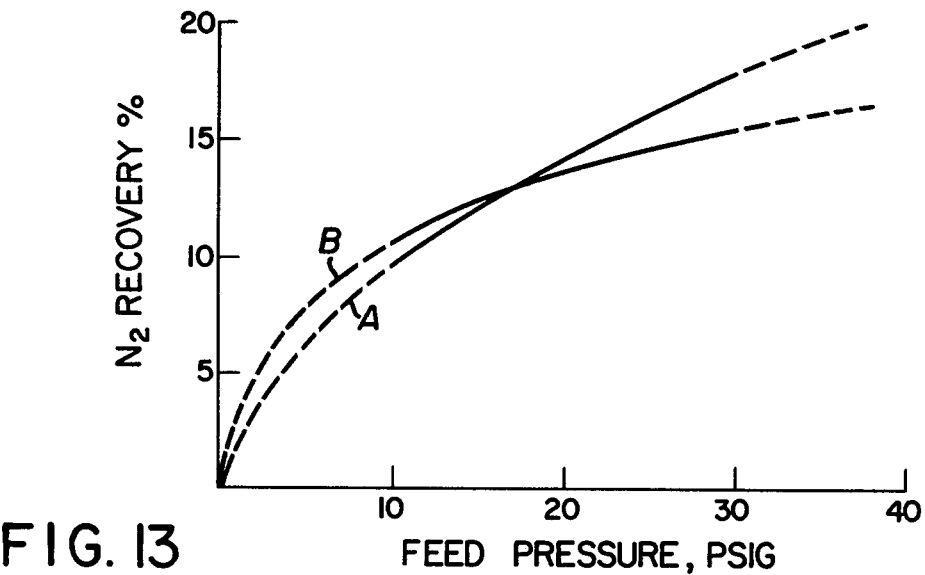
FIG. 13 is a graph showing the effect of feed pressure, feed time and adsorbent bed length on $N_2$ recovery from $N_2$-$CH_4$ feed gas and 2.3 seconds total cycle time, for RPSA processes of this invention and the prior art.
Figure 14:
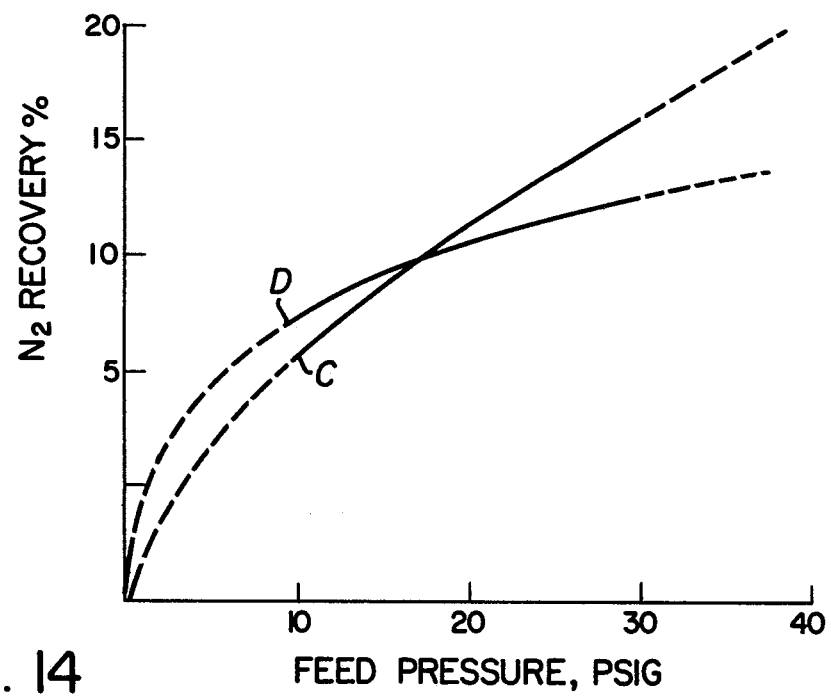
FIG. 14 is a graph showing the effect of feed pressure, feed time and adsorbent bed length on $N_2$ recovery from $N_2$-$CH_4$ feed gas and 10.3 seconds total cycle time, for RPSA processes of this invention and the prior art.

FIGS. 13 and 14 also show that up to feed pressures of about 17 psig. higher $N_2$ recoveries are obtained with the prior art equal feed-exhaust time cycles, and a crossover of the curves occurs at this pressure. Since the $CH_4$-$N_2$ separation factor is about 1.22, this data is consistent with the claimed invention, i.e., that the feed gas has a separation factor of at least 2.0 with the adsorbent for feed gas pressures only less than 30 psig. Stated otherwise, the only region of curves A and C in the scope of this invention is at feed pressure of 30 psig. and higher, where the product recovery improvement over the prior art is progressively increasing with increasing pressure. In contrast and as illustrated in FIGS. 7 and 8 with feed gas separation factors of at least 2.0, higher product recoveries are achieved by this invention at 30 psig. and lower feed gas pressures.

Additional tests were performed using the same 28.6 mol% $N_2$-71.4% $CH_4$ gas mixture but with a 60-inch long adsorbent bed, the same length used in the experiments described in the Turnock thesis. The feed gas pressure was 30 psig. the minimum suitable for practicing this invention with a separation factor below 2.0. The data from these tests is summarized in Table S, and demonstrates a substantial advantage in terms of nitrogen recovery for the short feed-long exhaust cycle.

TABLE S

Feed Composition: 28.6% $N_2$, 71.4% $CH_4$
Adsorbent: 20–40 mesh, 5A zeolite
Adsorbent Bed Size: ½ in. diameter, 60 in. long
Adsorbent Bed Weight: 230 gm
Exhaust and Product Pressure: 0 psig
Feed Pressure = 30 psig
Feed Pressure = 30 psig.
Product Surge Tank = None

| Timer Cycle | Flow Rates (l/hr+) | | | Mol % $N_2$ in | Nitrogen Recovery |
|---|---|---|---|---|---|
| (Sec) | Feed | Product | Exhaust | Product | (%) |
| 2.0,0,2.0 | 852 | 44.0 | 808 | 67.8 | 12.2 |
| 2.0,0,2.0 | 848 | 31.9 | 816 | 75.6 | 9.9 |
| 2.0,0,2.0 | 847 | 15.7 | 831 | 89.6 | 5.8 |
| 5.0,0,5.0 | 645 | 41.9 | 603 | 64.1 | 14.6 |
| 5.0,0,5.0 | 676 | 23.2 | 653 | 80.4 | 9.7 |
| 5.0,0,5.0 | 652 | 15.4 | 637 | 89.4 | 7.4 |
| 0.5,1.0,5.0 | 320 | 29.2 | 291 | 62.1 | 19.8 |
| 0.5,1.0,5.0 | 320 | 20.4 | 300 | 70.8 | 15.8 |
| 0.5,1.0,5.0 | 329 | 11.2 | 318 | 86.3 | 10.3 |
| 0.5,1.0,10.0 | 189 | 26.0 | 163 | 54.7 | 26.3 |
| 0.5,1.0,10.0 | 189 | 15.4 | 174 | 67.6 | 19.3 |
| 0.5,1.0,10.0 | 189 | 10.6 | 178 | 77.2 | 15.1 |

Another series of tests were performed with the same feed gas mixture used by Turnock but with smaller adsorbent particles (40-mesh) and a shorter bed (30 inches long) than in the Table S tests. The results are summarized in Table T.

TABLE T

| Feed Composition: | 28.6% $N_2$, 71.4% $CH_4$ |
|---|---|
| Adsorbent: | 40–80 mesh 5A Zeolite |
| Adsorbent Bed Size: | ½ in. diameter, 30 in. long |
| Adsorbent Bed Weight: | 114 gm |
| Exhaust and Product Pressure: | 0 psig. |
| Feed Pressure = 30 psig. | |
| Product Surge Tank = None | |

| Timer Cycle | Flow Rates (l/hr+) | | | Mol % $N_2$ in | Nitrogen Recovery |
|---|---|---|---|---|---|
| (sec) | Feed | Product | Exhaust | Product | (%) |
| 2.0,0,2.0 | 473 | 23.0 | 450 | 75.4 | 12.8 |
| 2.0,0,2.0 | 464 | 15.6 | 448 | 84.1 | 9.9 |
| 2.0,0,2.0 | 459 | 9.2 | 450 | 94.4 | 6.7 |
| 5.0,0,5.0 | 335 | 25.6 | 310 | 60.4 | 16.1 |
| 5.0,0,5.0 | 329 | 17.1 | 312 | 73.5 | 13.4 |
| 5.0,0,5.0 | 328 | 10.0 | 318 | 87.0 | 9.3 |
| 0.5,1.0,5.0 | 219 | 25.3 | 194 | 60.6 | 24.5 |
| 0.5,1.0,5.0 | 222 | 16.3 | 206 | 81.3 | 20.9 |

TABLE T-continued

| | | | | |
|---|---|---|---|---|
| 0.5,1.0,5.0 | 222 | 9.8 | 212 | 96.8 | 14.9 |

Although the equal feed-exhaust data and the short feed-long exhaust data for the $N_2$-$CH_4$ separation may not be compared quantitatively because there was no delay time in the former, a qualitative comparison is possible based on experiments with other gas mixtures and the data summarized in FIGS. 13 and 14. The nitrogen recoveries are substantially higher in the short feed-long exhaust cycles and the difference cannot be entirely attributed to the absence of delay time in the equal feed-exhaust cycles.

In another preferred embodiment a storage volume for discharged one component depleted gas is provided at and in flow communication with the adsorption bed second end, such that gas stored therein returns to the adsorption bed during the reverse outward flow. This product surge volume smooths out product and purge gas flows, and improves product recovery and adsorbent productivity as demonstrated in the operation of a pilot plant system similar to FIG. 1 operated without and with a product surge volume.

The adsorbent bed consisted of 40–80 mesh activated carbon of 5.76 inch diameter and 48 inches long (volume=0.72 ft$^3$). At the second end there was necessarily a small open volume of about 0.1 ft$^3$ between the bed end and the product flow control valve. The system was first operated with the 0.1 ft$^3$ volume at the product end to selectively adsorb methane from hydrogen. Then a piece of 6-inch diameter by 4-feet long pipe was added to the second end before the product flow control valve, increasing the product surge tank volume to 0.9 ft$^3$. The data from these tests is summarized in Table U. The data shows that the product surge tank increased hydrogen recovery about 8–10% and improved hydrogen productivity about 30%.

Although preferred embodiments have been described in detail, it will be appreciated that other embodiments are contemplated only with modification of the disclosed feature, as being within the scope of the invention.

least 8 psig. at said first end of said adsorbent bed, said feed gas having a separation factor of at least 2 with said adsorbent for feed pressures only less than 30 psig. and said adsorbent bed comprising particles smaller than 20 mesh but larger than 120 mesh being packed in a first to second end length (in inches) not exceeding three times the difference between feed gas and reverse outward flow pressure (in psig.) and less than 96 inches as said adsorbent bed, providing a first end flow suspension step between said feed gas introduction and said reverse outward flow which is less than ten times said feed gas introduction period and also less than one-half a second period of reverse outward flow, and thereafter performing said reverse outward flow for said second period of at least twice the feed gas introduction first period, with the first and second period and gas flows such that the one component enrichment factor is at least 4.

2. A process according to claim 1 in which air comprises said feed gas at 20–60 psig., crystalline zeolite molecular sieve of at least 5 Angstroms apparent pore size and between 40 and 80 mesh particle size comprises the adsorbent in a bed length of 15–30 inches, said feed gas introduction period is 0.1–1 second, the period of said flow suspension step is less than 2 seconds and also less than five times said feed gas introduction period, and the reverse outward flow period is 1–6 seconds but more than three times and less than forty times said feed gas introduction period and terminates at substantially atmospheric pressure.

3. A claim according to claim 1 in which air comprises said feed gas at 20–60 psig., crystalline zeolite molecular sieve of at least 5 Angstroms apparent pore size and between 40 and 80 mesh particle size comprises the adsorbent in a bed length of 3–5 feet, said feed gas introduction period is 0.3–1 second, the period of said flow suspension step is between five and ten times said feed gas introduction period but less than 5 seconds, and the reverse outward flow period is 8–20 seconds and terminates at substantially atmospheric pressure.

4. A process according to claim 1 in which air comprises said feed gas at 8–15 psig., crystalline zeolite molecular sieve of at least 5 Angstroms apparent pore size and between 40 and 80 mesh particle size comprises

TABLE U

| | | The Effect of Product Surge Volume | | | | | | | | |
|---|---|---|---|---|---|---|---|---|---|---|
| Timer Cycle (Sec) | Inlet Pressure (psig) | Flow Rate (SLFM) | | | Hydrogen Purity (%) | | Pressure Swing (psig) | | | Recovery (%) | Additional Product Surge Tank in Service |
| | | Feed | Product | Exhaust | Feed | Product | Adsorption Bed | Exhaust Surge Tank | Product Surge Tank | | |
| 0.5, 1, 3.0 | 365 | 7798 | 2227 | 5571 | 79.2 | 98.0 | 355/72 | 81/59 | 208/68 | 35.3 | NO |
| 0.5, 1, 3.0 | 355 | 8125 | 2938 | 5187 | 78.7 | 97.9 | 350/70 | 73/59 | 154/76 | 45.0 | YES |
| 0.5, 1, 5.0 | 350 | 4789 | 1087 | 3702 | 72.8 | 98.0 | 345/70 | 79/59 | 193/65 | 30.6 | NO |
| 0.5, 1, 5.0 | 365 | 5075 | 1466 | 3609 | 70.0 | 98.0 | 355/70 | 71/59 | 140/67 | 40.4 | YES |
| 0.5, 1, 2.0 | 360 | 8378 | 1939 | 6439 | 72.2 | 97.7 | 350/77 | 85/60 | 217/80 | 31.3 | NO |
| 0.5, 1, 2.0 | 360 | 8534 | 2500 | 6034 | 72.1 | 97.8 | 355/80 | 76/59 | 163/97 | 39.7 | YES |

What is claimed is:

1. In a rapid adiabatic pressure swing process for the separation of a multi-component feed gas by selectively adsorbing at least one component in a single adsorption bed of small particles by introducing feed gas to a first end and discharging at least one component depleted gas at the second end with a repetitive two-step cycle sequence at the first end of feed gas introduction and reverse outward flow of at least one component-depleted purging one component desorbate gas and a total cycle time of less than 30 seconds, the improvement comprising; providing said feed gas at pressure of at said adsorbent in a bed length of 15–30 inches, said feed gas introduction period if 0.25–1.5 seconds, said flow suspension period is between one-half and three times the feed gas introduction period but less than 1.5 seconds, and the reverse outward flow period is between two and one-half and twelve times the feed gas introduction period and also between 3 and 6 seconds and terminates at substantially atmospheric pressure.

5. A process according to claim 1 in which air comprises said feed gas at 8–15 psig., crystalline zeolite molecular sieve of at least 5 Angstroms apparent pore size and between 40 and 80 mesh particle size comprises said adsorbent in a bed length of 15-30 inches, said feed gas introduction period and said flow suspension period are each 0.75-2.0 seconds, and the reverse outward flow period is between two and eight times the feed gas introduction period and also between 3 and 6 seconds, and terminates at atmospheric pressure.

6. A process according to claim 1 in which air comprises said feed gas, and the adsorbent comprises crystalline zeolite molecular sieve of at least 5 Angstroms aparent pore size and betweem 40 and 80 mesh particle size such that between 25 and 35% by weight of the adsorbent is between 60 and 80 mesh particle size.

7. A process according to claim 1 in which a mixture of 65% to 90% by volume ethylene and nitrogen comprises said feed gas at 30-60 psig., activated carbon of between 20 and 80 mesh particle size comprises said adsorbent in a bed length of 2-5 feet, said feed gas introduction period is 0.1-1 second, said flow suspension period is less than 2 seconds and less than five times the feed gas introduction period, and the reverse outward flow period is 1-6 seconds but more than three times and less than forty times the feed gas introduction period and terminates at substantially atmospheric pressure.

8. A process according to claim 1 in which hydrogen and methane comprise said feed gas at 140-500 psig., activated carbon between 20 and 100 mesh particle size comprises said adsorbent in a bed length of 2-5 feet, said feed gas introduction period is 0.1-1 second, said flow suspension period is less than 1.5 seconds and less than four times the feed gas introduction period, and the reverse outward flow period is 1-5 seconds and between three and forty times the feed gas introduction period.

9. A process according to claim 1 in which hydrogen and carbon monoxide comprise said feed gas at 140-400 psig., crystalline zeolite between 20 and 60 mesh particle size comprises said adsorbent in a bed length of 2-5 feet, said feed gas introduction period is 0.1-1 second, said flow suspension period is less than 1.5 seconds and less than four times the feed gas introduction period, and the reverse outward flow period is 1-5 seconds and between three and ten times the feed gas introduction period.

10. A process according to claim 1 in which the feed gas is a mixture of hydrogen as the desired product, carbon dioxide, methane and carbon monoxide comprises said feed gas at 120-300 psig., a homogeneous mixture of activated carbon and crystalline zeolite molecular sieve of at least 4 Angstroms apparent pore size and between 40 and 80 mesh particle size comprises the adsorbent in a bed length of 3-5 feet, said feed gas introduction period is 0.1-1 second, the period of said flow suspension step is less than 1.5 seconds and also less than four times said feed gas introduction period, and the reverse outward flow period is 1-10 seconds and between three and twenty times said feed gas introduction period, and the exhaust pressure is 0-60 psig.

11. A process according to claim 1 in which the pressure during reverse outward flow does not exceed 0 psig.

12. In a rapid adiabatic pressure swing process for the separation of a multi-component feed gas by selectively adsorbing at least one component in a single adsorption bed of small particles by introducing feed gas to a first end and discharging at least one component depleted gas at the second end with a repetitive two-step cycle sequence at the first end of feed gas introduction and reverse outward flow of at least one component-depleted purging one component desorbate gas and a total cycle time of less than 30 seconds, the improvement comrising: providing said feed gas at pressure of at least 8 psig. at said first end of said adsorbent bed, said feed gas having a separation factor of at least 2 with said adsorbent for feed pressures only less than 30 psig. and said adsorbent bed comprising particles smaller than 20 mesh but larger than 120 mesh being packed in a first to second end length (in inches) not exceeding three times the difference between feed gas and reverse outward flow pressure (in psig.) and less than 96 inches as said adsorbent bed, thereafter performing said reverse outward flow for a second period such that the feed gas introduction first period is no more than 20% of the first plus second period total time, and with the first and second period and gas flows such that the one component enrichment factor is at least 4.

13. In a rapid adiabatic pressure swing process for the separation of a multi-component feed gas by selectively adsorbing at least one component in a single adsorption bed of small particles by introducing feed gas to a first end and discharging at least one component depleted gas at the second end with a repetitive two-step cycle sequence at the first end of feed gas introduction and reverse outward flow of at least one component-depleted purging one component desorbate gas and a total cycle time of less than 30 seconds, the improvement comprising; providing said feed gas at pressure of at least 8 psig, at said first end of said adsorbent bed, said feed gas having a separation factor of at least 2 with said adsorbent for feed pressures only less than 30 psig. and said adsorbent bed comprising particles smaller than 20 mesh but larger than 120 mesh being packed in a first to second end length (in inches) not exceeding three times the difference between feed gas and reverse outward flow pressure (in psig.) and less than 96 inches as said adsorbent bed, continuing said feed gas introduction period for 0.1-1 second, and thereafter performing said reverse outward flow for a second period at least twice the feed gas introduction first period, with the first and second period and gas flows such that the one component enrichment factor is at least 4.

14. A process according to claim 13 wherein said feed gas introduction first period is no more than 20% of the first plus second period total time.

* * * * *